Dec. 15, 1964  H. H. ALBINSON ETAL  3,161,182
TWO-CYCLE INTERNAL COMBUSTION ENGINE
Filed Jan. 11, 1960  23 Sheets-Sheet 14
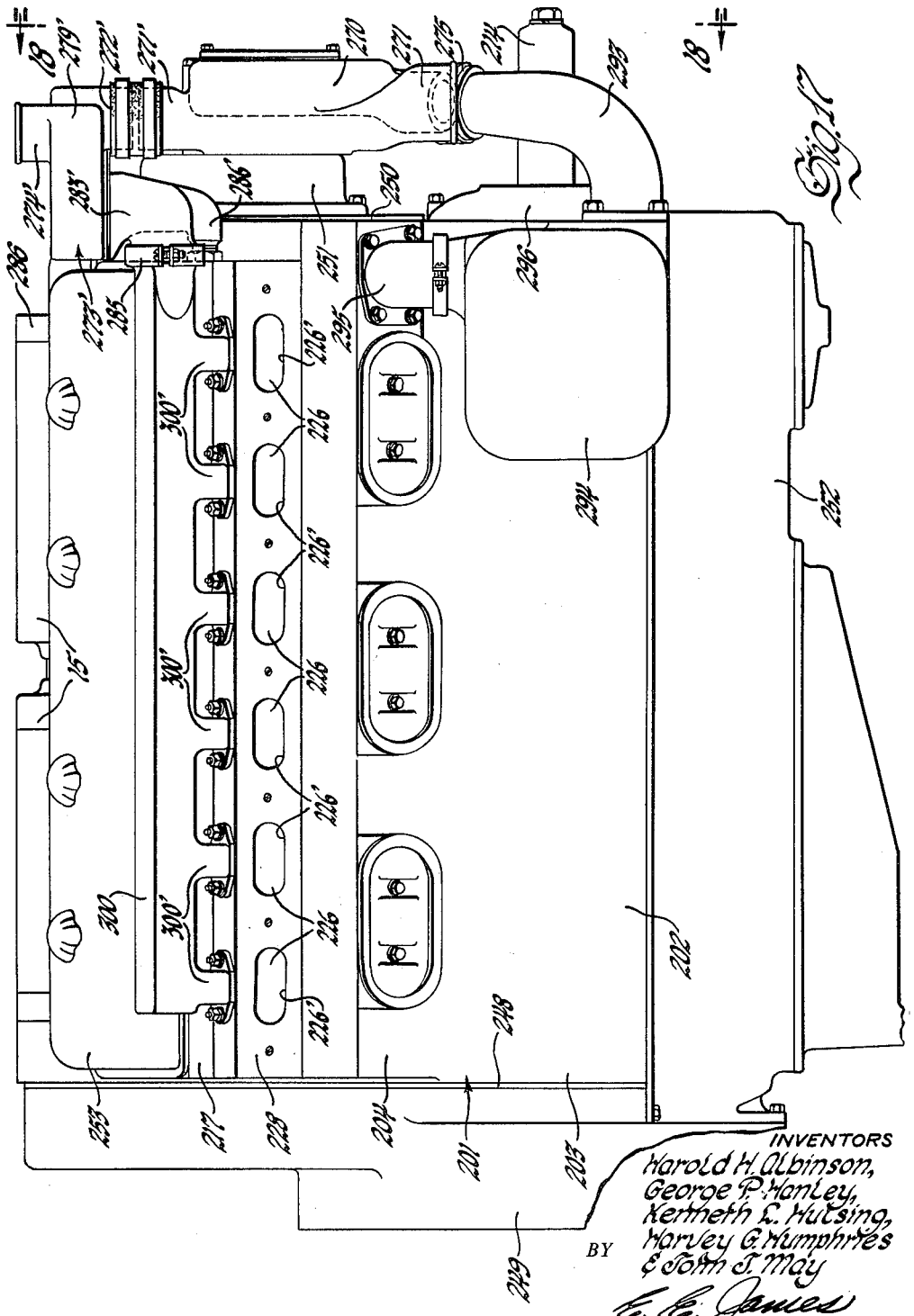

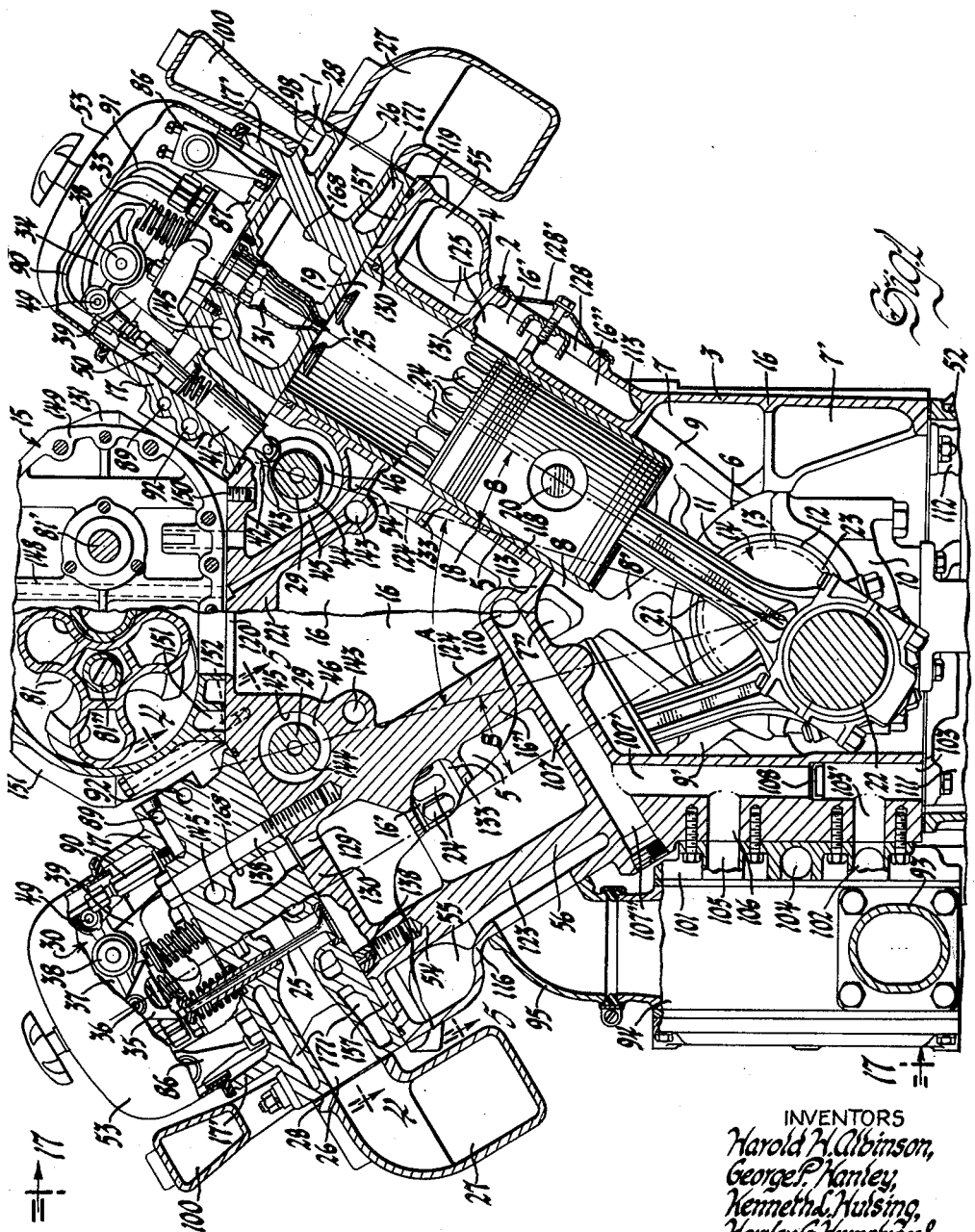

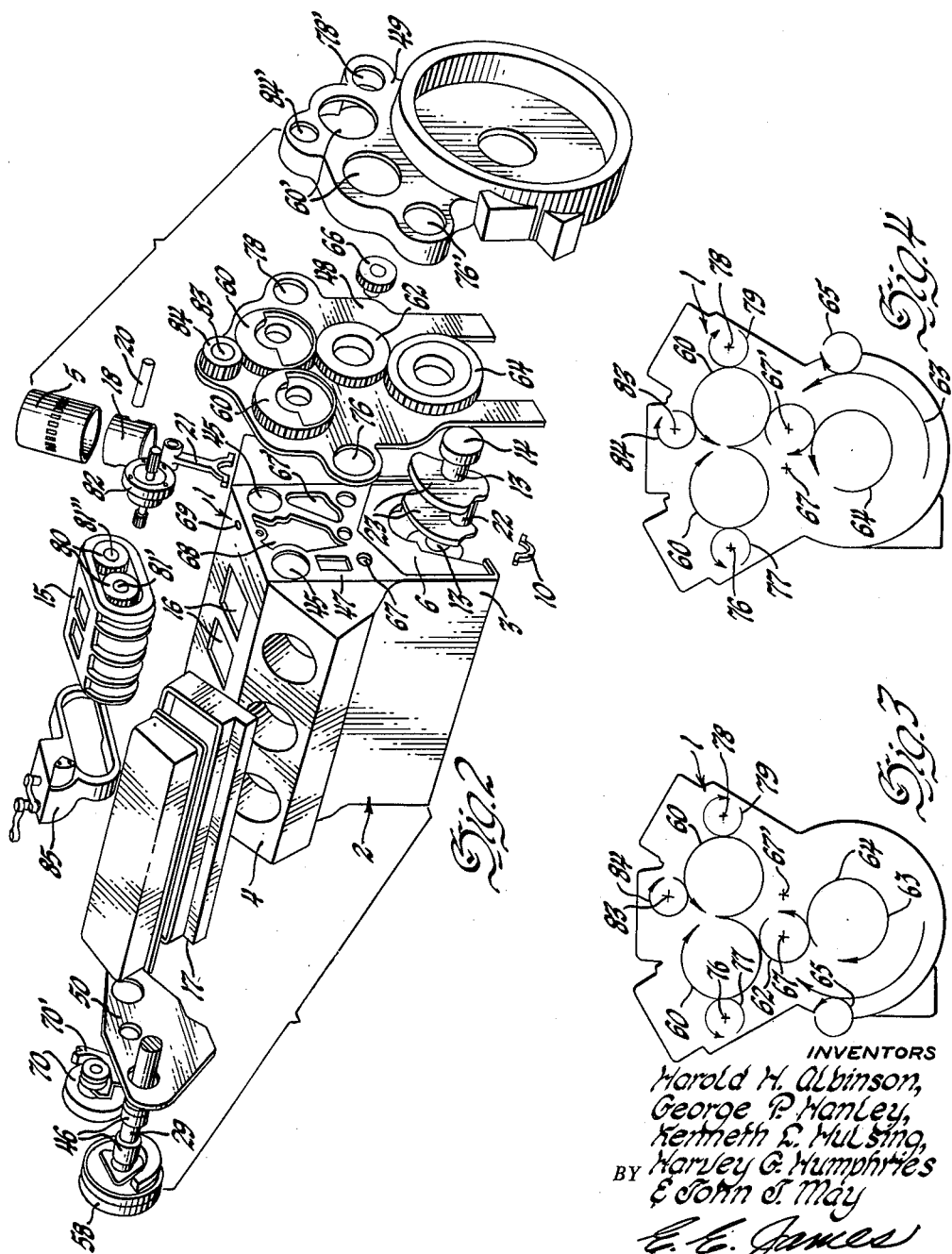

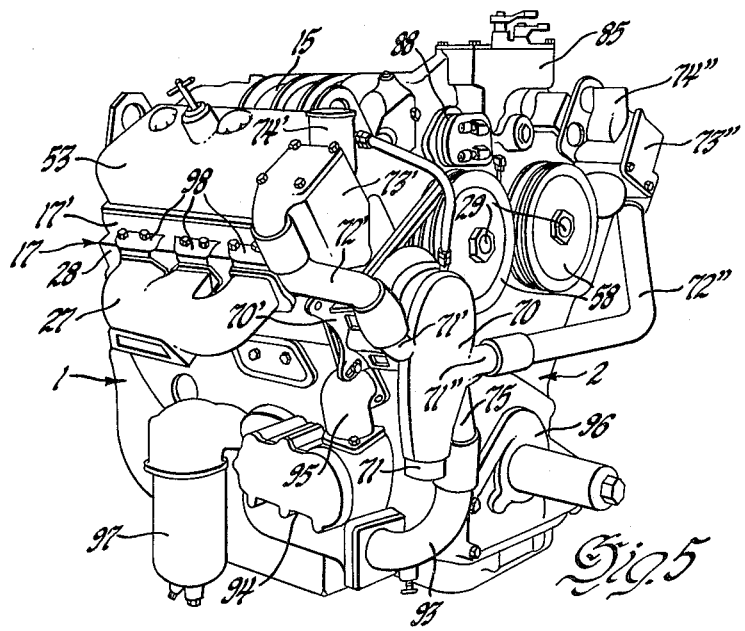
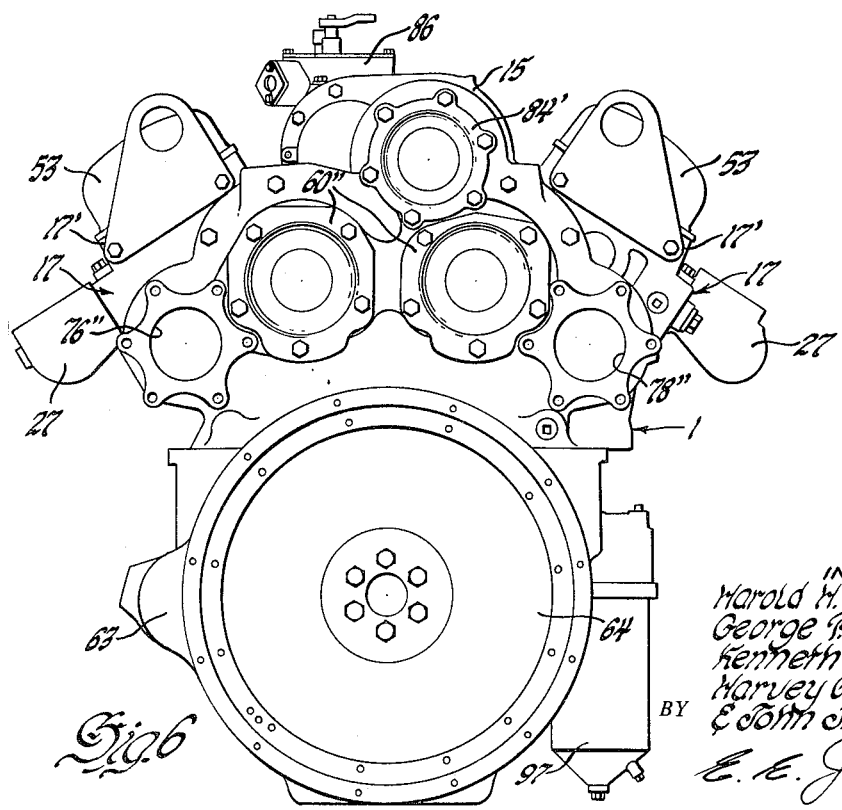

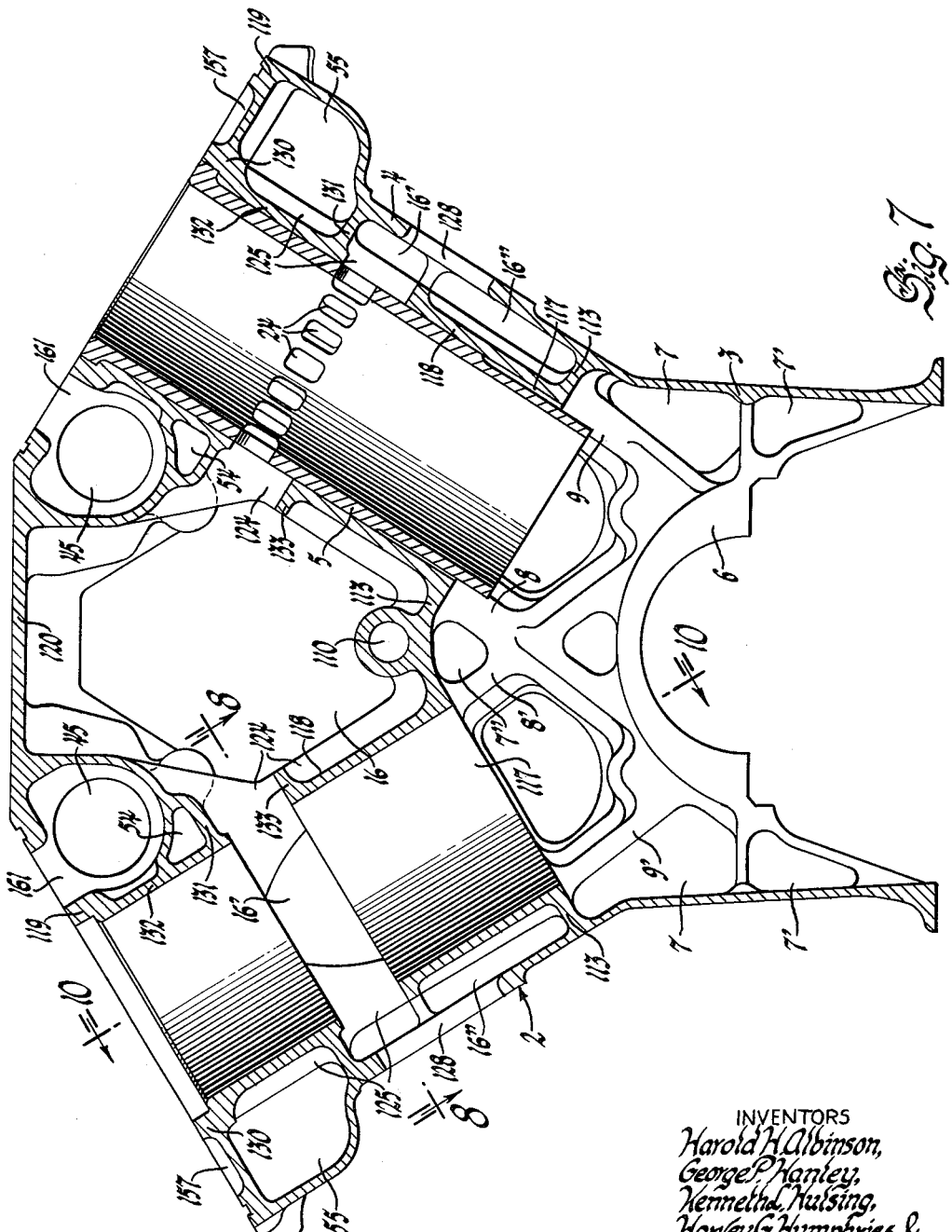

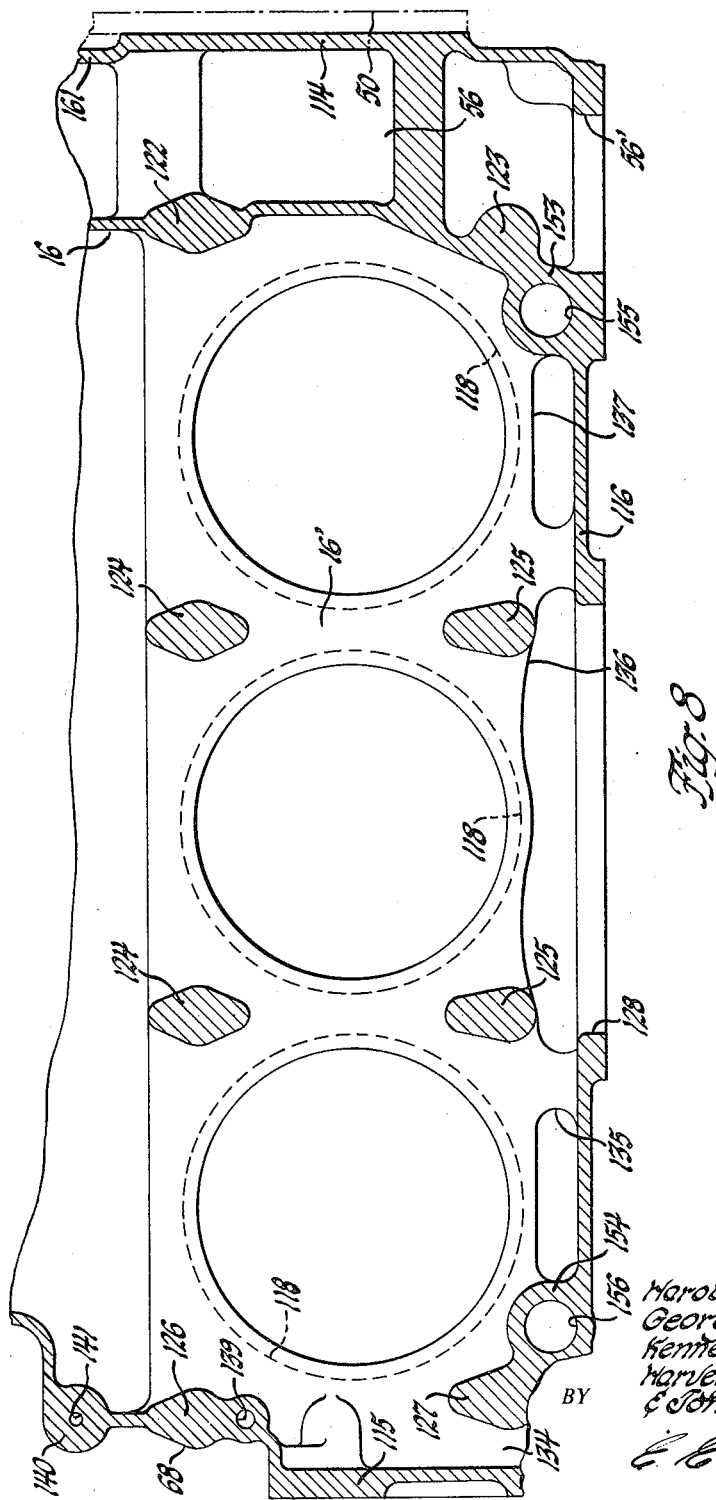

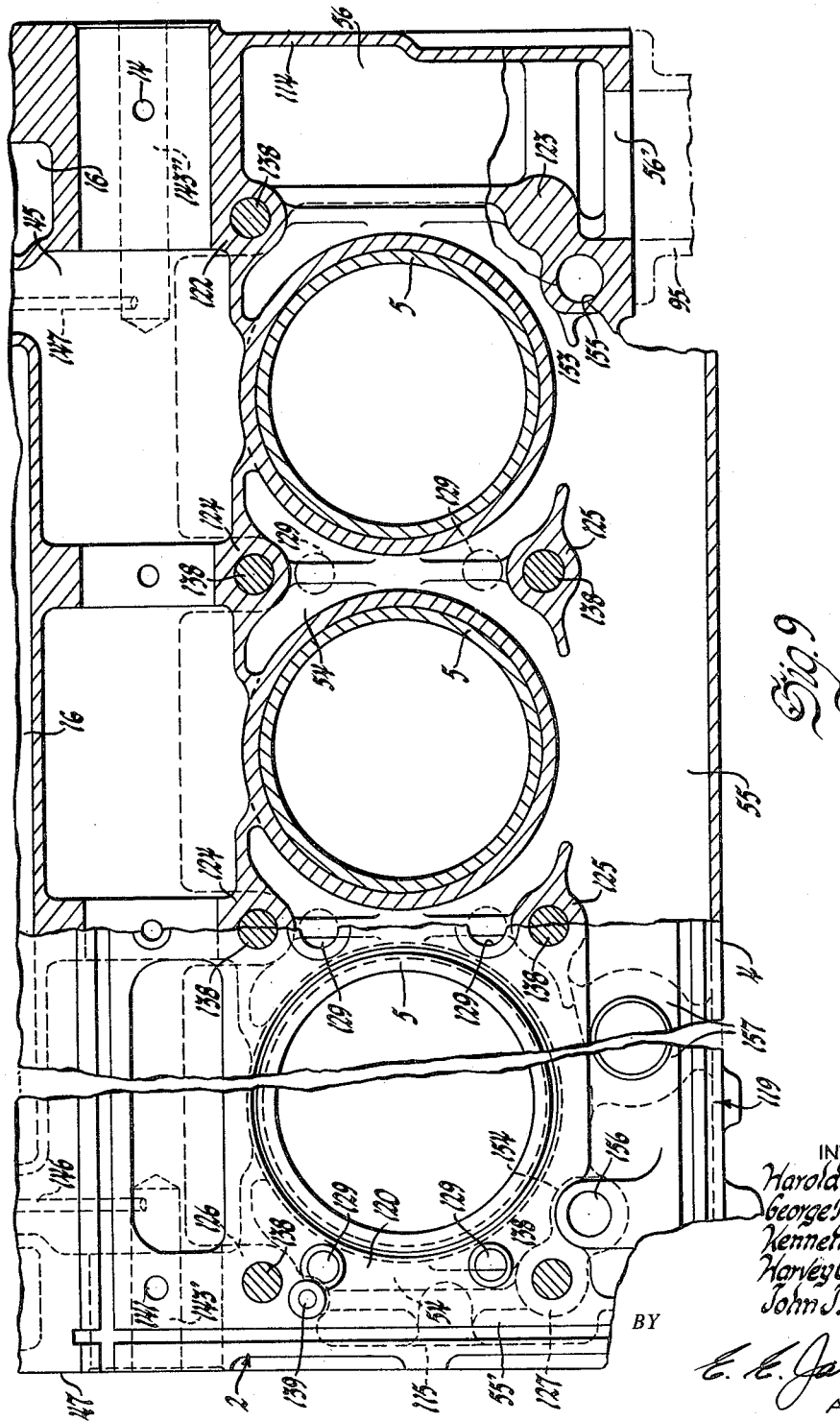

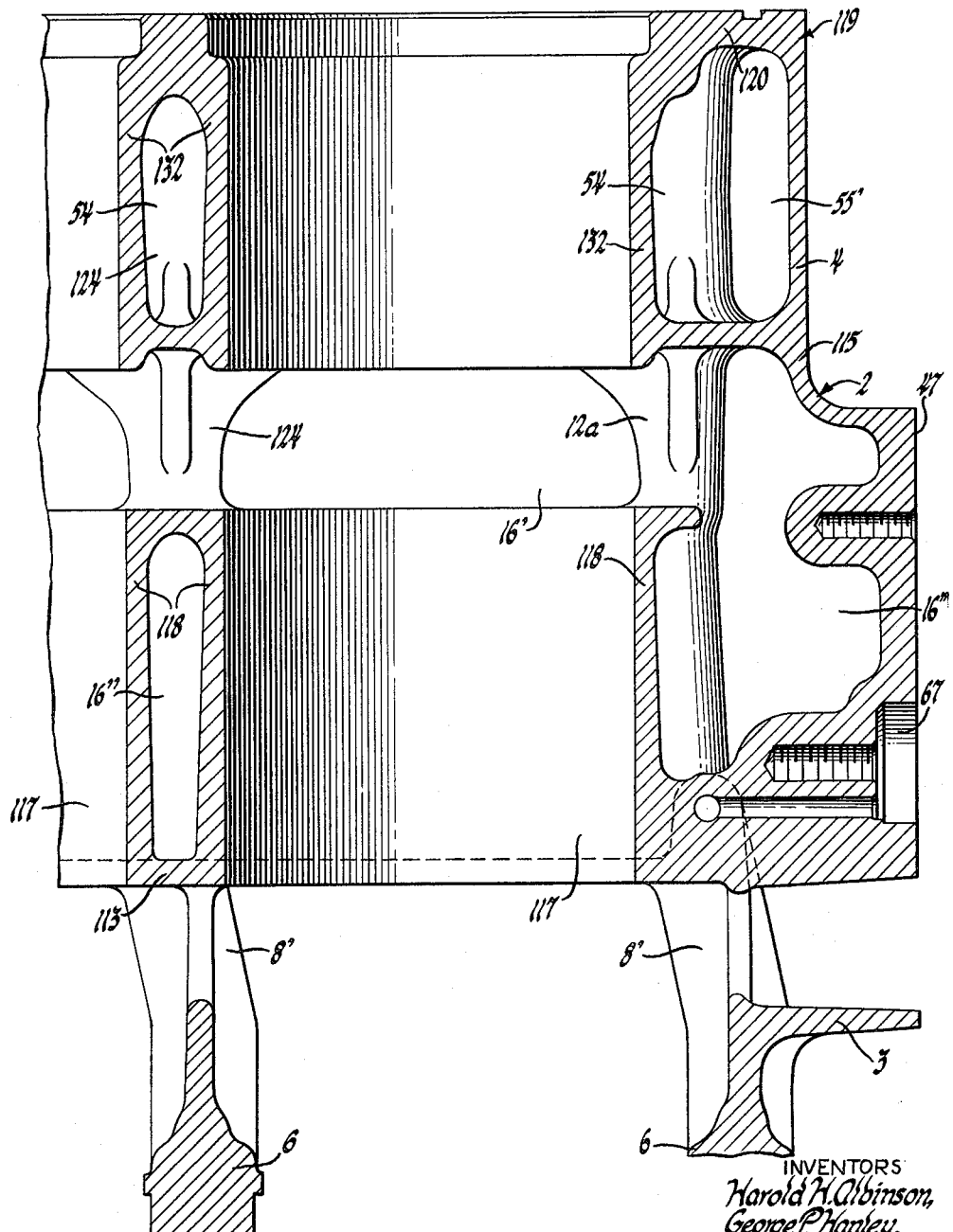

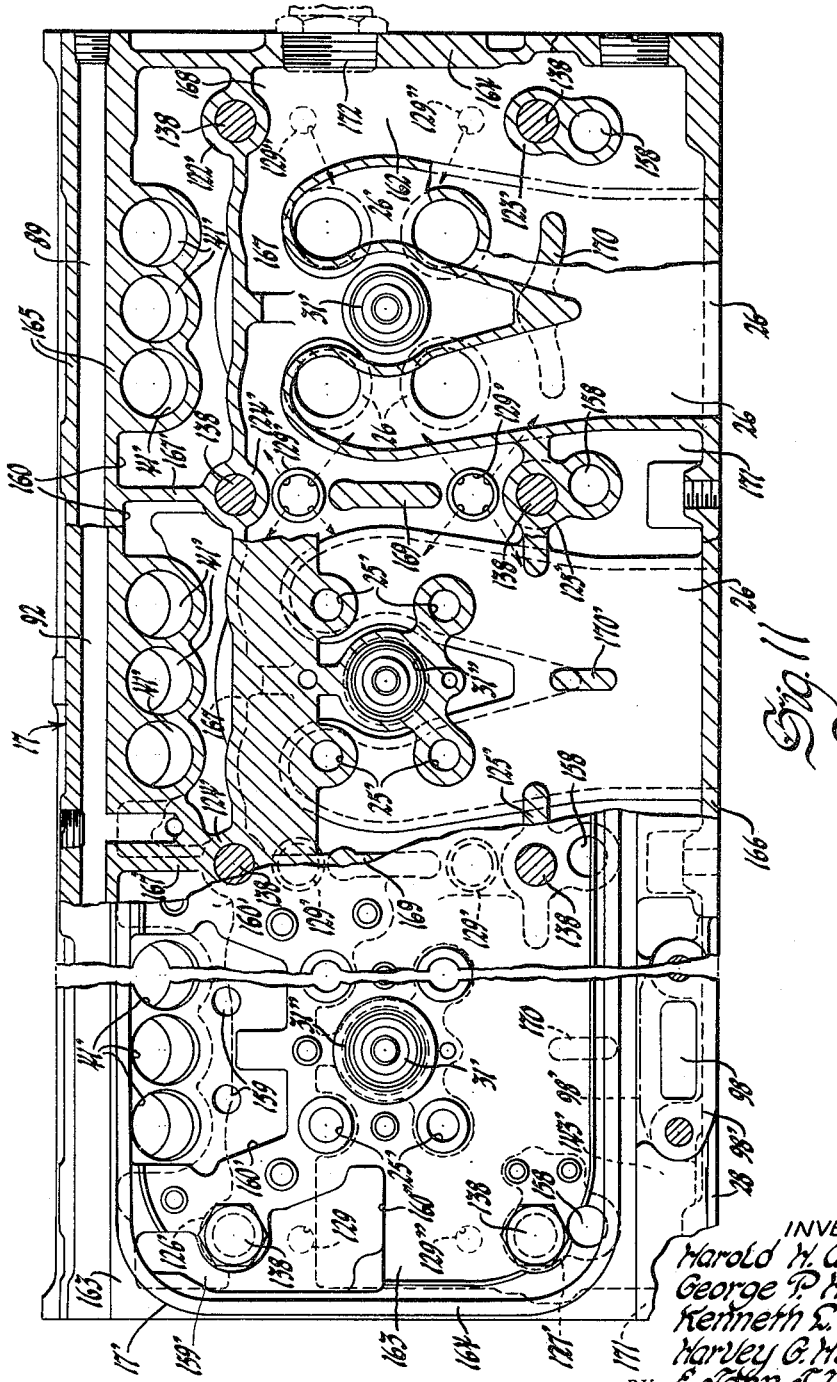

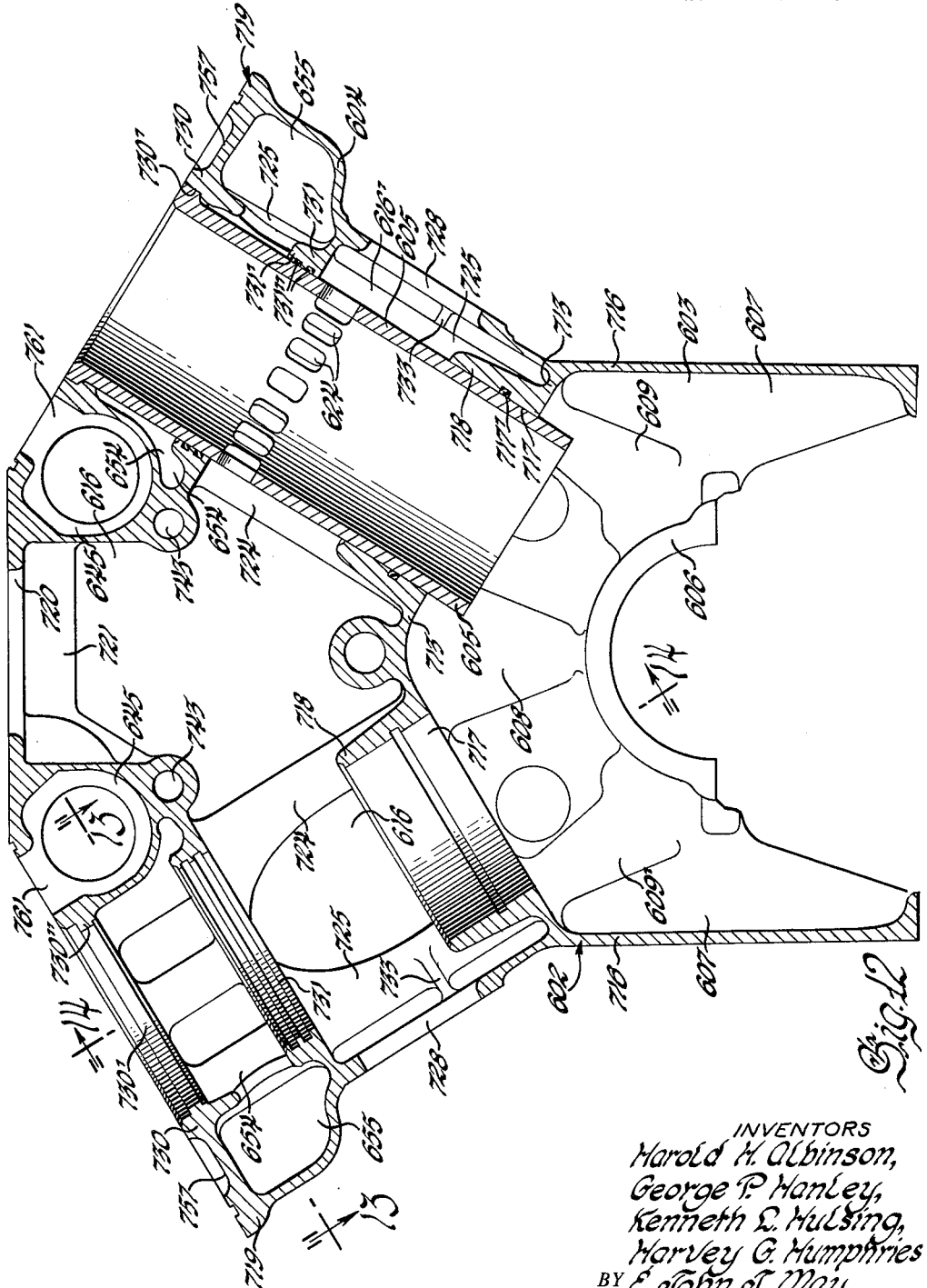

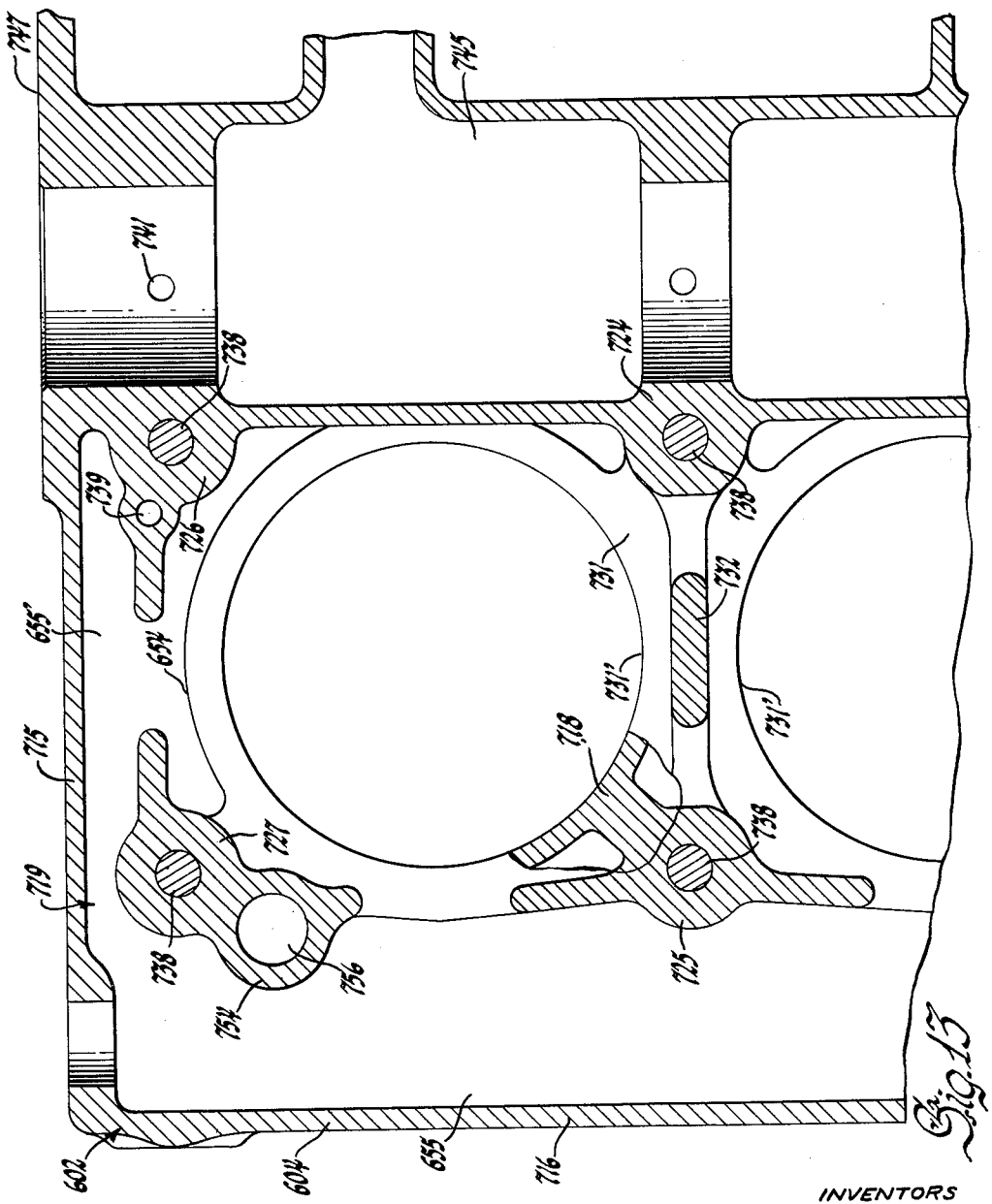

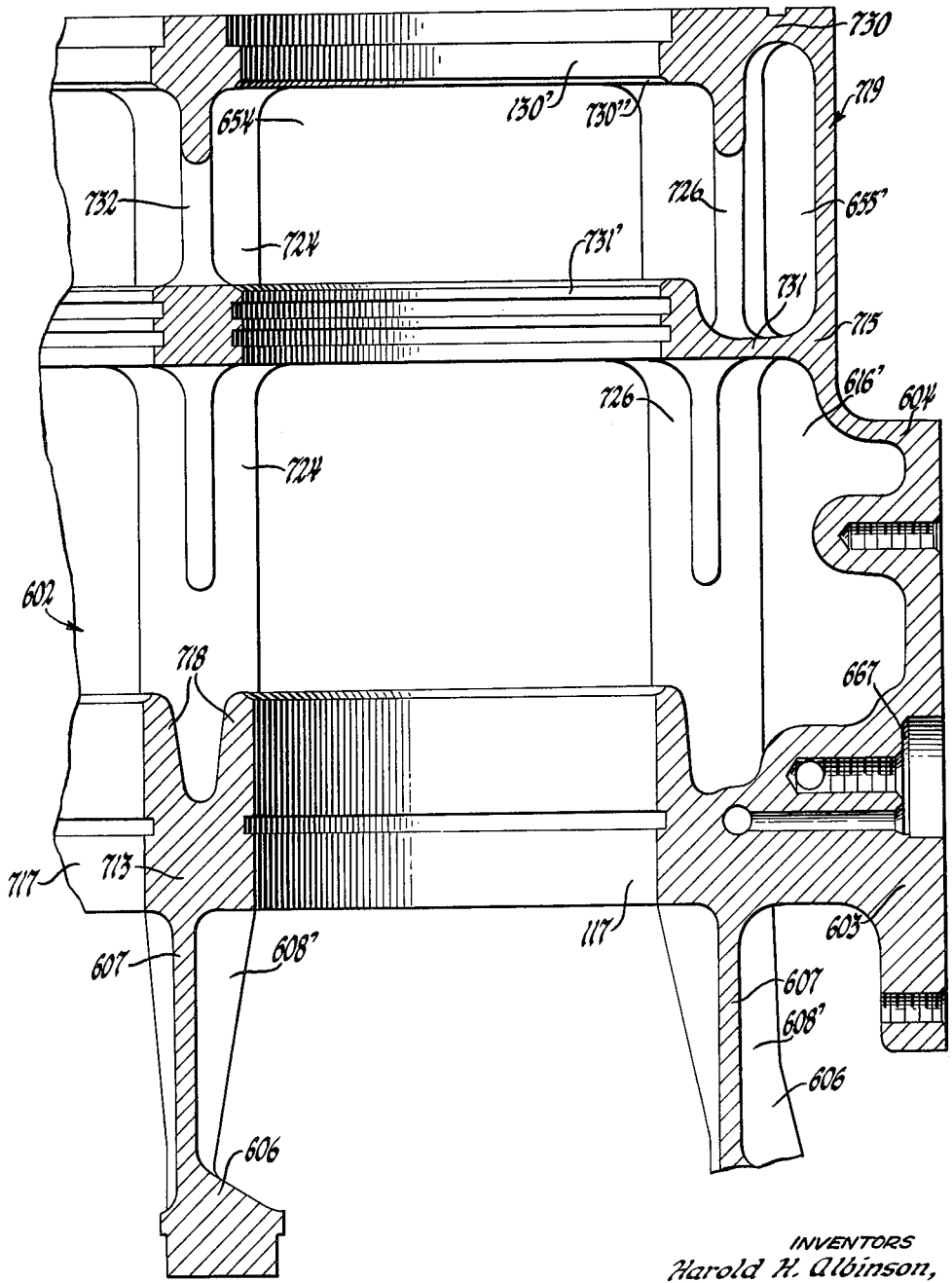

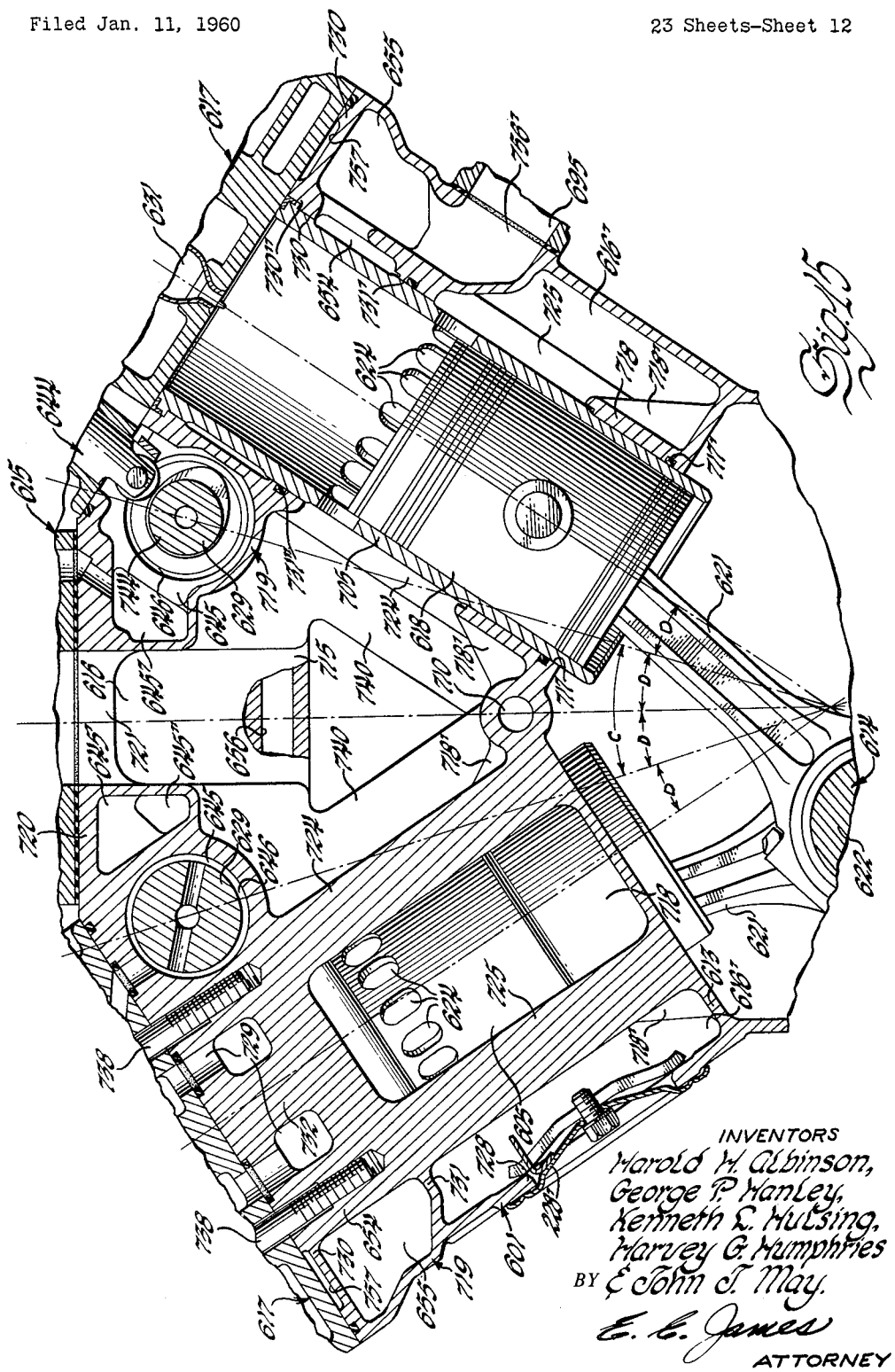

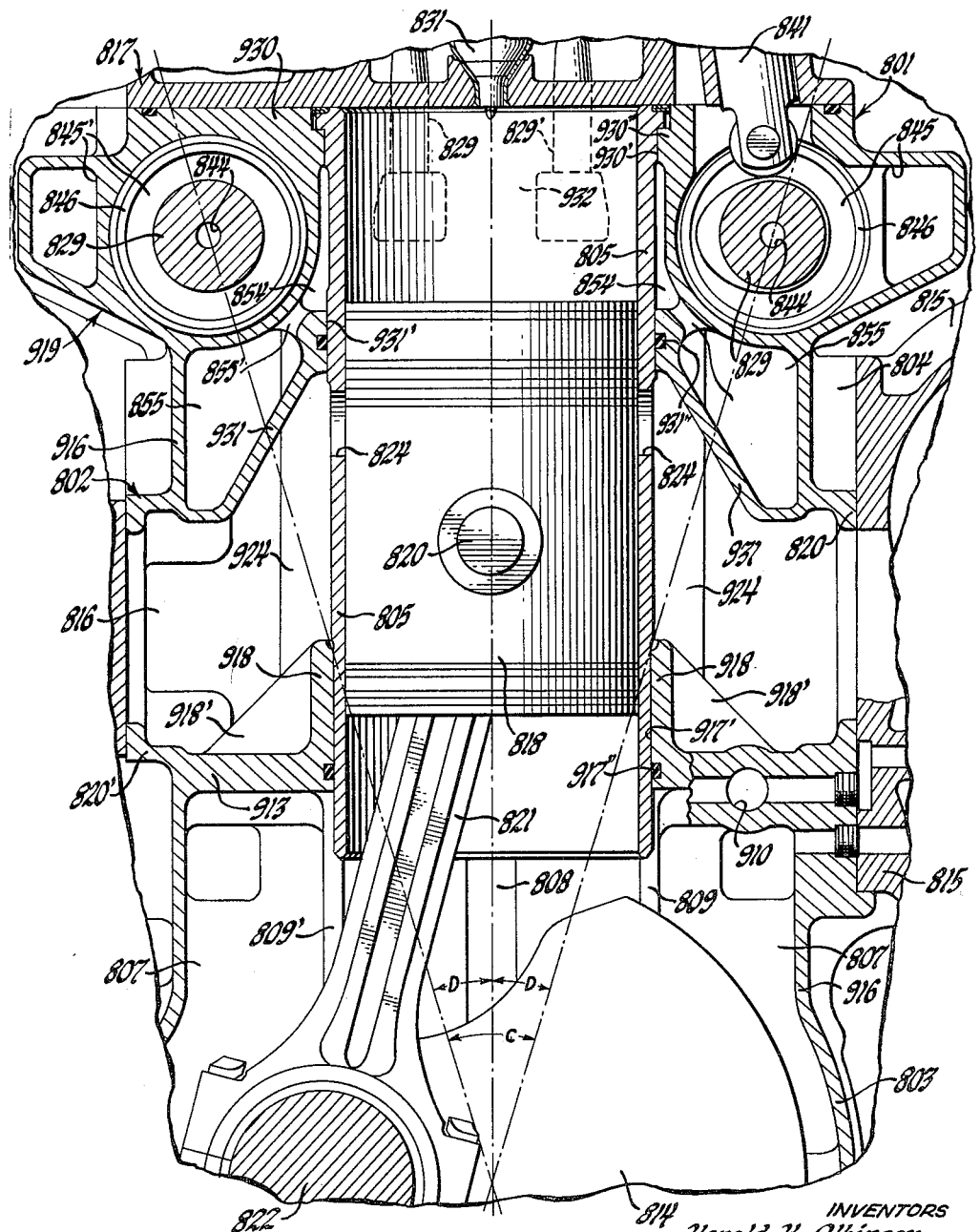

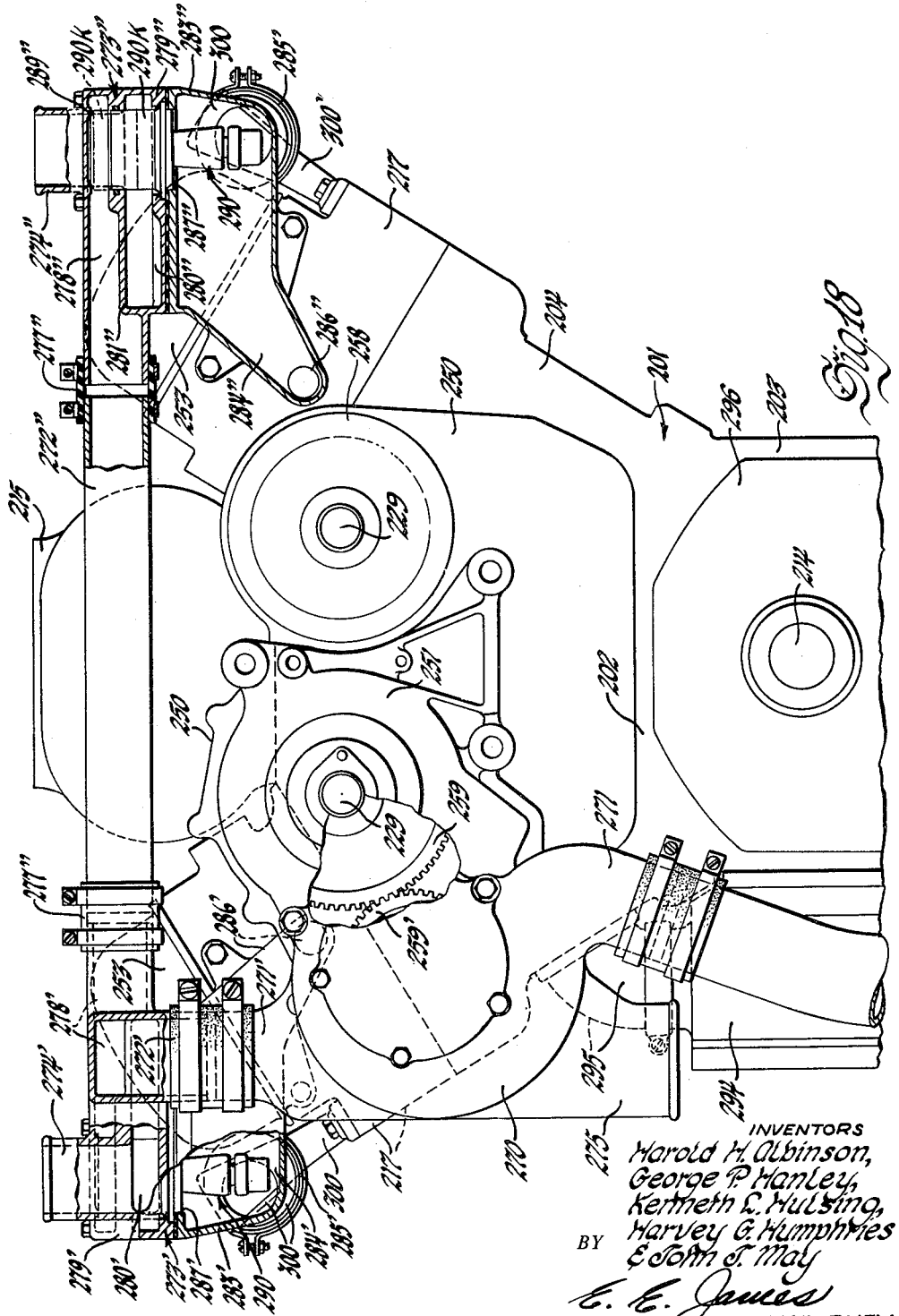

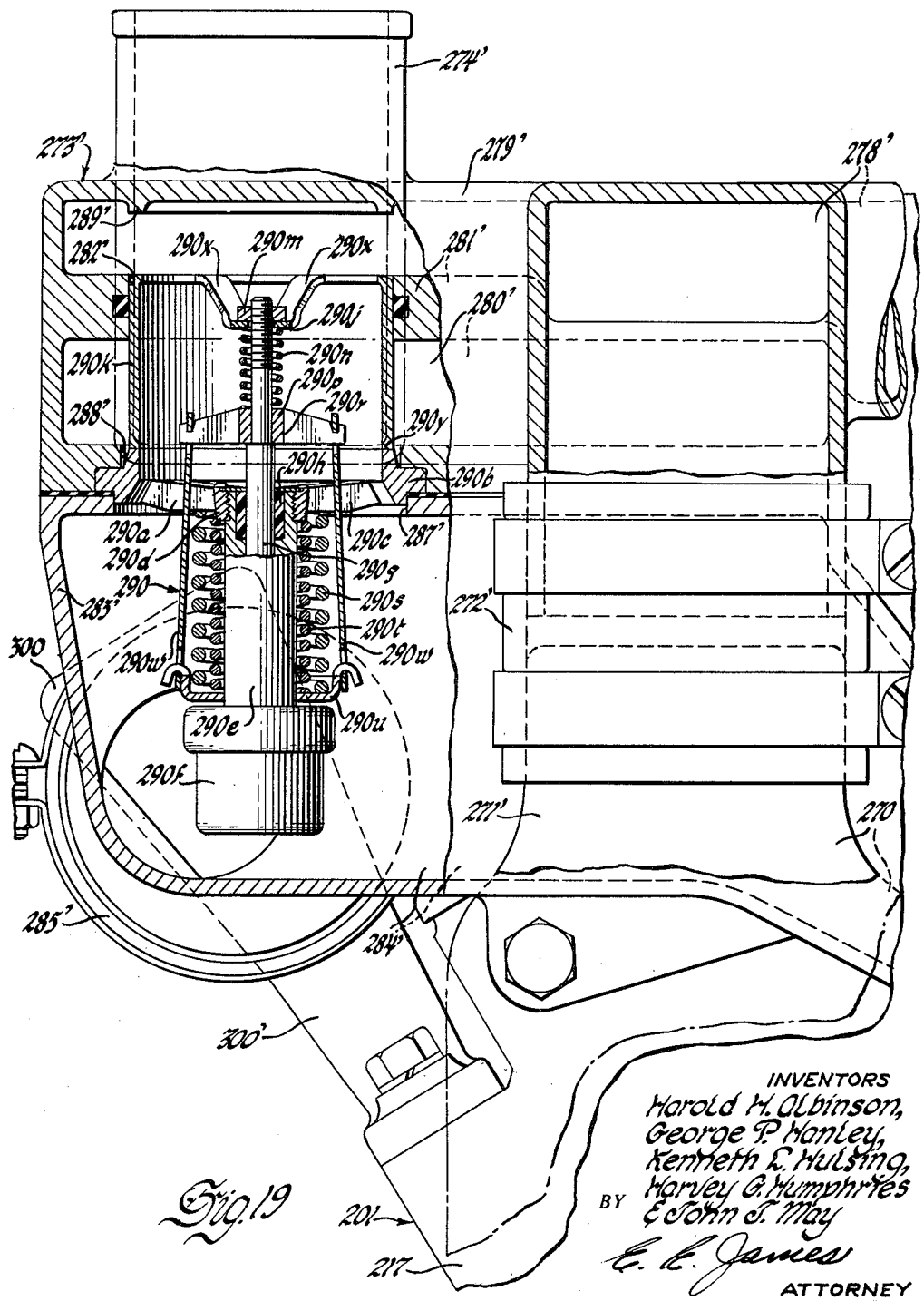

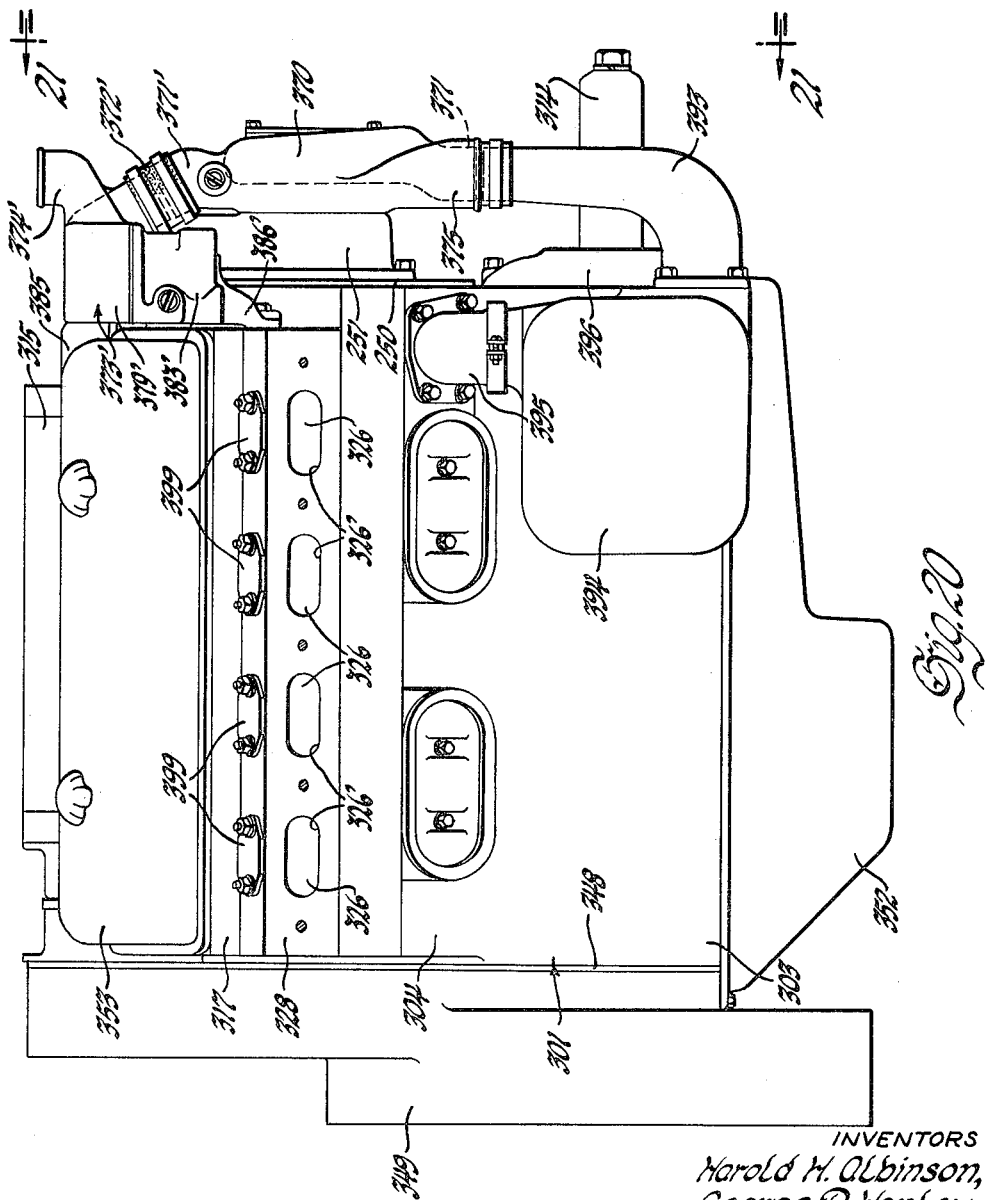

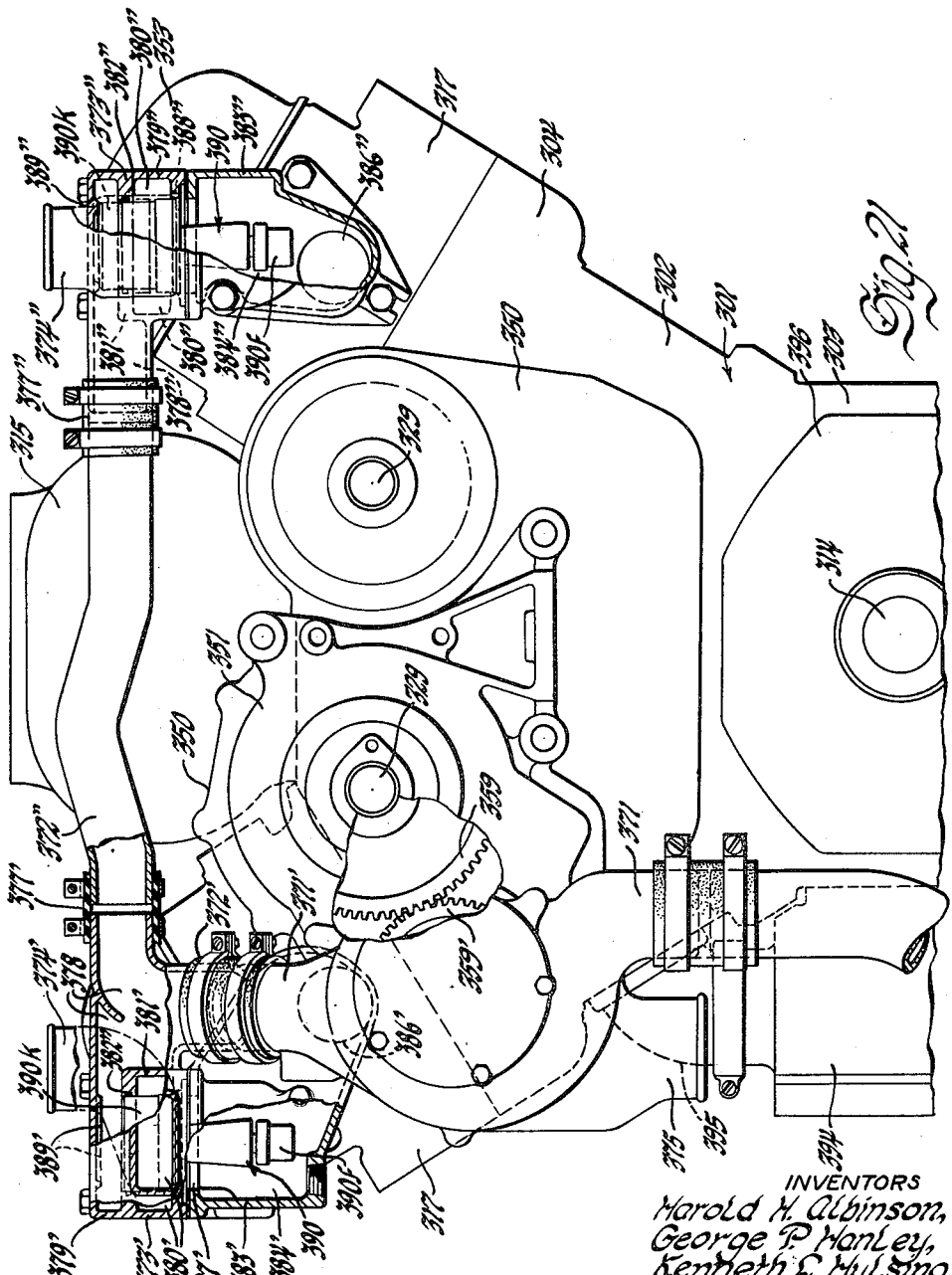

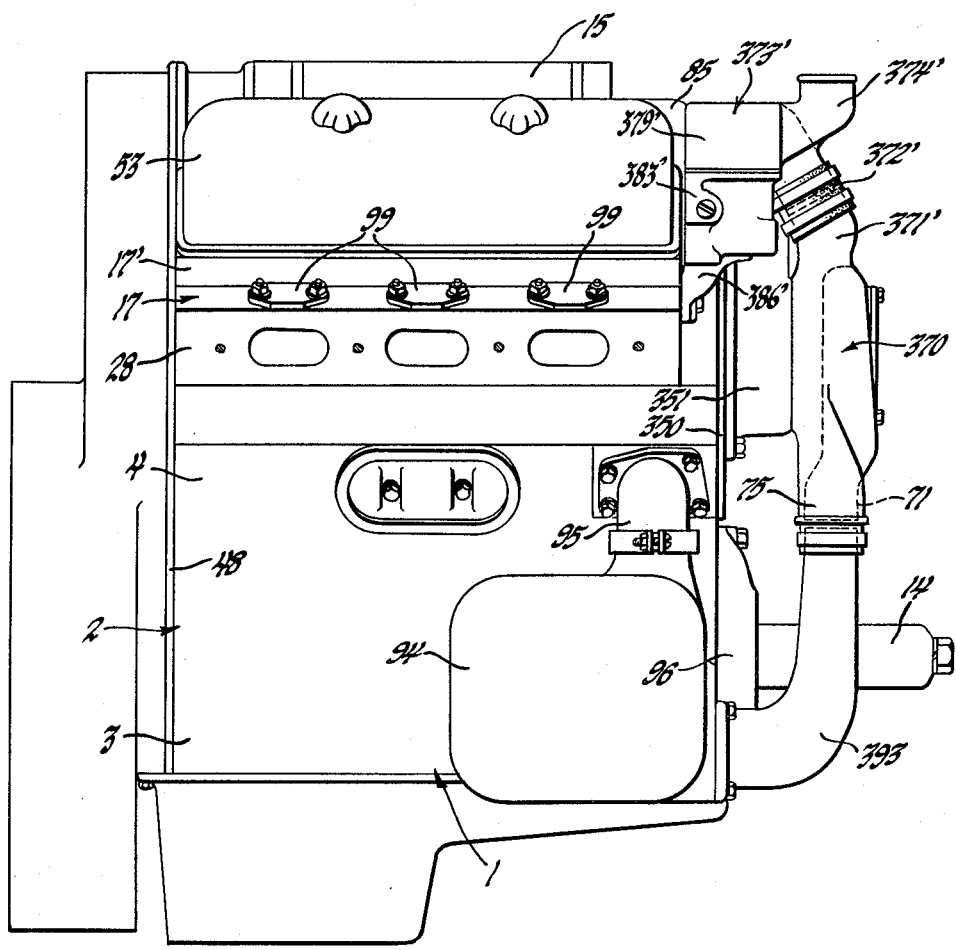

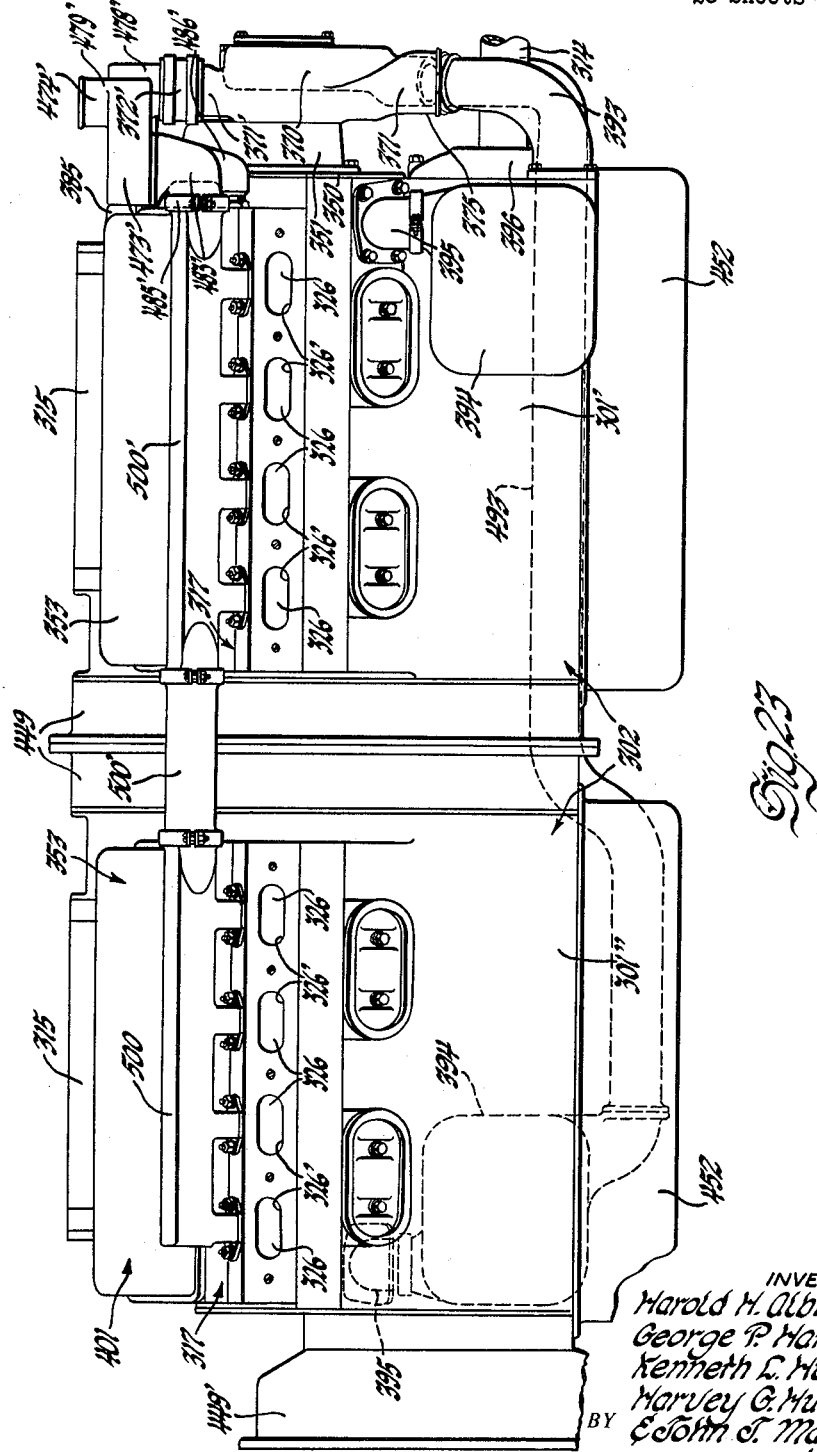

Dec. 15, 1964     H. H. ALBINSON ETAL     3,161,182
TWO-CYCLE INTERNAL COMBUSTION ENGINE
Filed Jan. 11, 1960     23 Sheets-Sheet 21
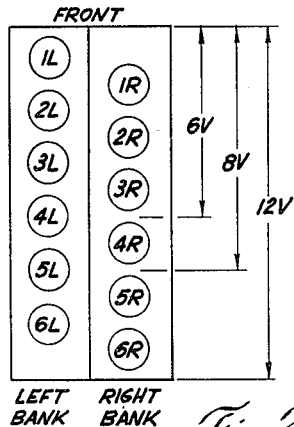
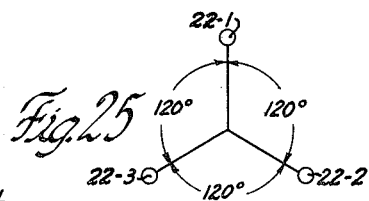
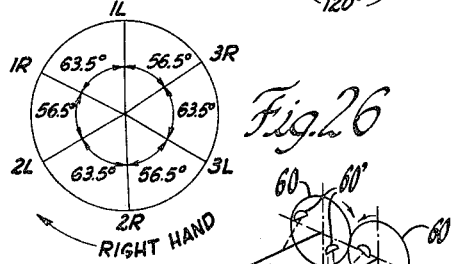
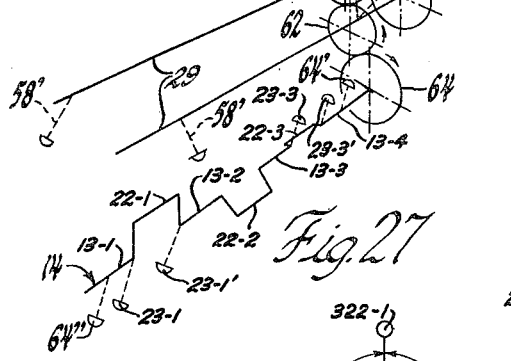
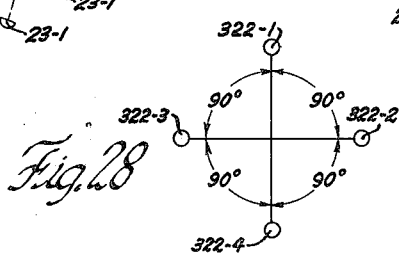
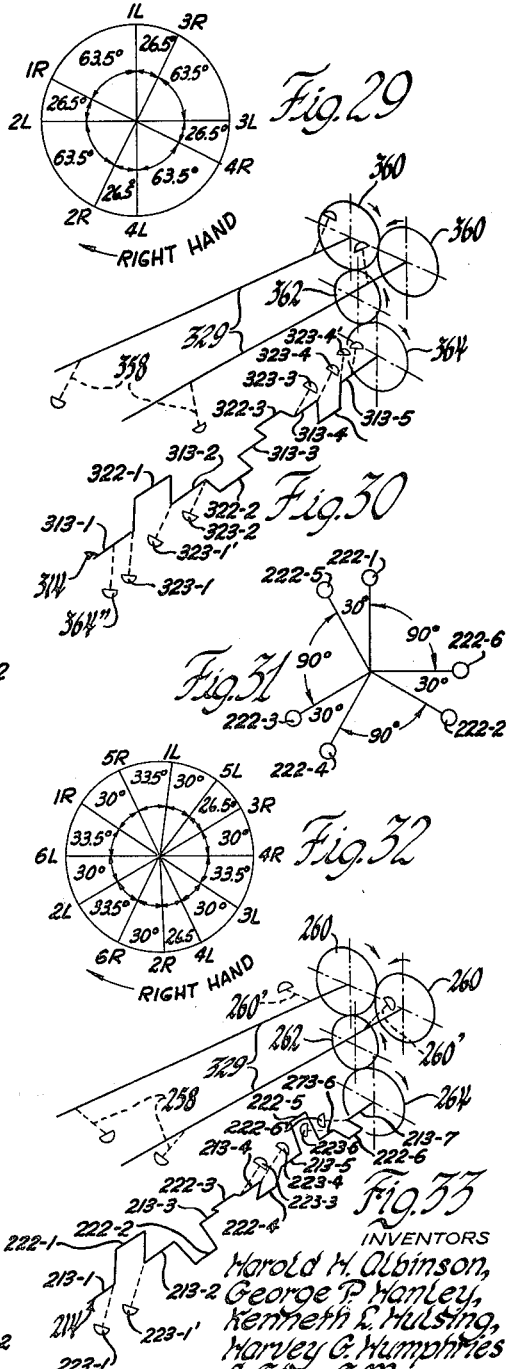
INVENTORS
Harold H. Albinson,
George P. Hanley,
Kenneth L. Hulsing,
Harvey G. Humphries
& John J. May
BY
E. E. James
ATTORNEY

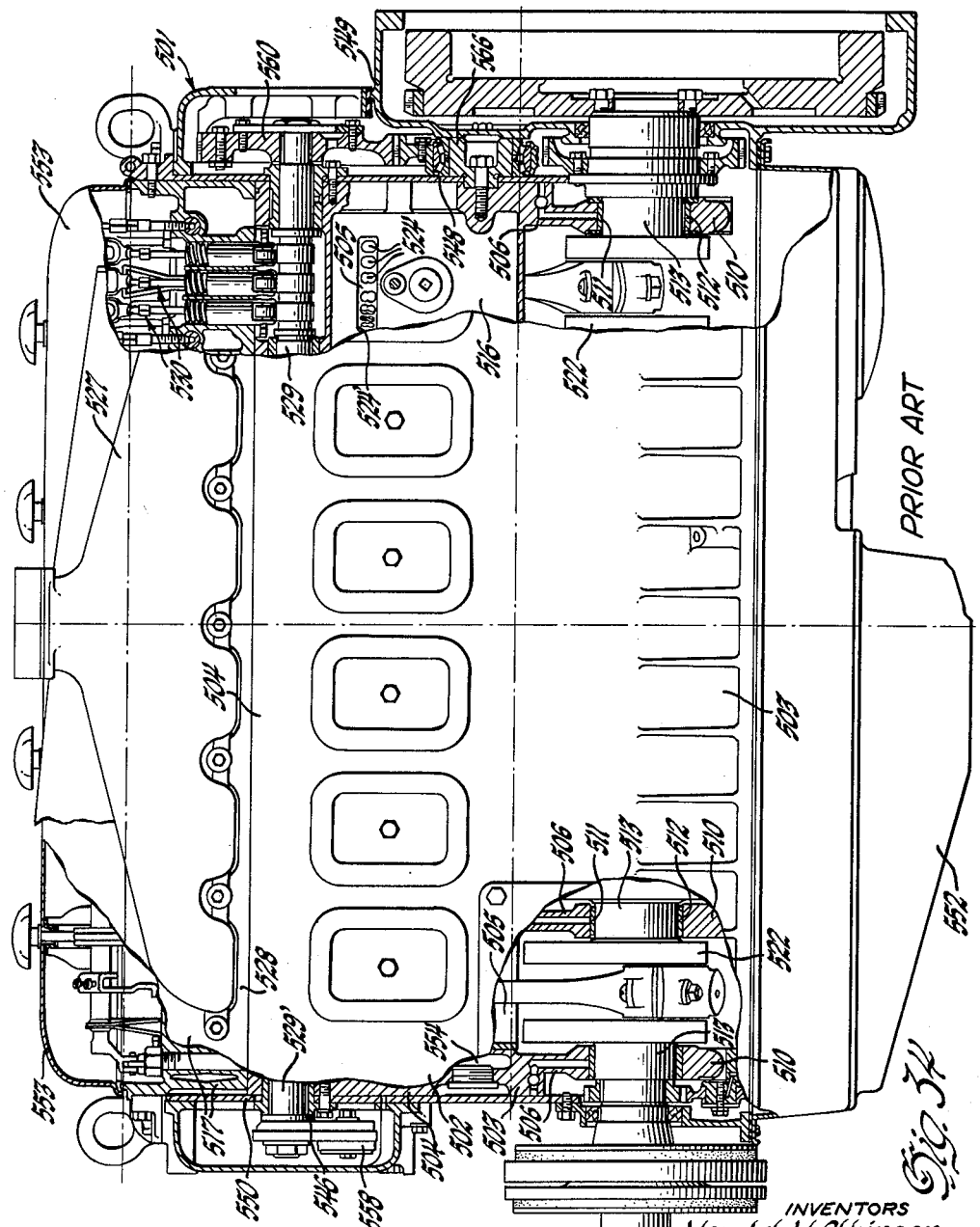

United States Patent Office 3,161,182
Patented Dec. 15, 1964

3,161,182
TWO-CYCLE INTERNAL COMBUSTION ENGINE
Harold H. Albinson, Detroit, George P. Hanley, Northville, Kenneth L. Hulsing, Plymouth, and Harvey G. Humphries and John J. May, Birmingham, Mich., assignors to General Motors Corporation, Detroit, Mich., a corporation of Delaware
Filed Jan. 11, 1960, Ser. No. 1,488
24 Claims. (Cl. 123—32)

This invention relates generally to internal combustion engines, more particularly to such engines of the two-stroke cycle uniflow scavenged type, and with regard to certain more specific aspects of the invention to improved cylinder block constructions and water cooling systems for such engines.

In its broader aspects, the invention contemplates a series of multi-cylinder inline and V engines of the type described based on and improving the design of an existing series of inline engines corresponding to that shown and described in Brecht 2,179,709. In the inline engines of the Brecht patent, a camshaft and a balance shaft are journaled in parallel relation to each other and extend longitudinally of the upper portion of the cylinder block in flanking relation to the cylinder row. These shafts are counterrotated and carry engine balancing masses adjacent either end thereof. These shafts may be interchanged to provide a plurality of different engine models by the simple expedient of reversing the cylinder head end-for-end and making appropriate changes in the accessory mountings and timing gear drives as shown in FIGURES 6–13 of the patent.

In accordance with certain aspects of the invention, common dimensioning is provided and maintained between the inline and V engines to permit maximum interchangeability between the several inline and V engines of substantially all basic engine components, subassemblies and accessories except the cylinder blocks, crankshafts and camshafts. Such dimensioning permits corresponding and interchangeable machining of even those non-interchangeable components. To provide interchangeability of the cylinder heads and of the valve and injector actuating assemblies, the cylinder dimensioning and spacing in each bank of the several V engines is the same as in the inline engines, both longitudinally of the engine and with respect to the axis of the crankshaft. To permit the use of the same accessory and timing gear drives and flywheel housings in both the inline and V engines, two counterrotating camshafts are provided having the same parallel spaced relation as that existing between the camshaft, balance shaft and crankshaft of the inline engine. The resultant location and structure of the spaced parallel camshaft galleries contributes to the structural rigidity of the upper portion of the block and permits the mounting of an engine scavenging and charging blower on the upper deck of the cylinder block. The blower discharges into an air box defined by and extending longitudinally intermediate the V'd cylinder banks of the cylinder block.

Such common dimensioning between the several inline and V engines thus contributes substantially to engine compactness and rigidity and permits the design of a V engine series of relatively high power density, the several V engines being relatively light in relation to total power output. The resultant interchangeability of components and machining operations between the several inline and V engines serves to substantially reduce and distribute manufacturing costs over a greater volume of engines and to reduce the number of parts required for service inventory. The resultant V engines are also characterized by improved breathing and overall efficiency due to the decrease in the longitudinal dimension of the air box and the increased air box capacity per cylinder which is approximately twice that of the inline engine.

In accordance with certain further aspects of the invention, these characteristics of the several V engines are further improved by providing a cylinder block casting which is of relatively light, rigid girder-box construction; which is relatively easy to core, cast and clean and machineable by the same tooling used to machine the inline cylinder blocks and thus relatively inexpensive; and which provides an improved water cooling system for such engines. Certain of these novel aspects of the several V engine cylinder block constructions have been found applicable also in providing relatively light, but more rigid, inline cylinder block constructions.

The foregoing and other objects, advantages and features of the invention will be apparent from the following description of several embodiments illustrative of the various aspects thereof, reference being made to the accompanying drawings, in which:

FIGURE 1 is a transverse sectional view of a V-type two-cycle internal combustion engine with portions thereof broken away to show certain structural details common to a series of engines constructed in accordance with the invention;

FIGURE 2 is a somewhat diagrammatic, exploded perspective view showing partial assembly of a six-cylinder V engine typical of the engine series shown in transverse section in FIGURE 1;

FIGURES 3 and 4 are diagrammatic views of alternative accessory gear drive systems accommodating clockwise and counterclockwise crankshaft rotation of the several inline and V engines, respectively;

FIGURE 5 is a perspective view showing one form of front end and accessory mounting configuration for a complete six-cylinder V engine similar to that shown in exploded perspective in FIGURE 2 typical of the series of engines shown in transverse section in FIGURE 1;

FIGURE 6 is a rear elevational view of the engine of FIGURE 5 and is typical of the rear elevational views of the engine series;

FIGURE 7 is an enlarged transverse sectional view of the cylinder block shown in FIGURE 1;

FIGURE 8 is a sectional view of the cylinder block taken substantially in the plane of the line 8—8 of FIGURE 7;

FIGURE 9 is an elevational view of the left bank of the cylinder block as viewed in FIGURE 1 with portions thereof broken away and in section;

FIGURE 10 is a sectional view of the cylinder block taken substantially in the plane of the line 10—10 of FIGURE 7;

FIGURE 11 is a top elevational view of the left bank cylinder head as viewed in FIGURE 1 with portions thereof broken away and in section;

FIGURE 12 is a view similar to FIGURE 7 showing an alternative wet-liner cylinder block construction embodying certain aspects of the invention;

FIGURE 13 is a sectional view of the cylinder block of FIGURE 12 and taken substantially in the plane of the line 13—13 of FIGURE 12;

FIGURE 14 is a sectional view taken substantially in the plane of the line 14—14 of FIGURE 12;

FIGURE 15 is a transverse sectional view showing a portion of a V-type, two-cycle internal combustion engine having an alternative form of cylinder block constructed in accordance with certain aspects of the invention;

FIGURE 16 is a transverse sectional view showing the application of certain aspects of the invention to an inline two-cycle internal combustion engine;

FIGURE 17 is an elevational side view of a twelve-cylinder engine belonging to the series of two-cycle V engines shown in transverse section in FIGURE 1 and is taken substantially in the direction of the arrows 17—17 of FIGURE 1;

FIGURE 18 is a front elevational view taken substantially in the plane of the arrows 18—18 of FIGURE 17 with portions thereof broken away and in section to show certain details of the water cooling system of the twelve-cylinder engine of FIGURE 17;

FIGURE 19 is an enlarged view similar to a portion of FIGURE 18 with portions thereof broken away and in section to show the details of the thermostatically operated bypass control valve;

FIGURE 20 is a side elevational view similar to FIGURE 17 and shows an eight-cylinder V engine belonging to the series of V engines shown in transverse section in FIGURE 1;

FIGURE 21 is a front elevational view taken substantially in the direction of the arrows 21—21 of FIGURE 20 with portions thereof broken away and in section to show certain details of the water cooling system of the eight cylinder V engine of FIGURE 20;

FIGURE 22 is a side elevational view similar to FIGURES 17 and 20 and shows a six-cylinder V engine having a front end configuration similar to that of the eight-cylinder V engine of FIGURES 20 and 21;

FIGURE 23 is a side elevational view showing a compound sixteen-cylinder engine comprising two of the eight-cylinder V engines of FIGURE 20 drivingly interconnected in tandem;

FIGURE 24 is a diagrammatic view showing the cylinder designations of the several V engines;

FIGURES 25, 26 and 27 are diagrammatic views showing the crankthrow arrangement, firing order and balancing system of the six-cylinder V engines of FIGURES 2, 5 and 22;

FIGURES 28, 29 and 30 are diagrammatic views showing the crankthrow arrangement, firing order and balancing system of the eight-cylinder V engine of FIGURES 20 and 21;

FIGURES 31, 32 and 33 are diagrammatic views showing the crankthrow arrangement, firing order and balancing system of the twelve-cylinder V engine of FIGURES 17-19;

FIGURE 34 is a side elevational view with portions thereof broken away and in section and is illustrative of a six-cylinder engine typical of the previous inline series of engines.

Figure 35:
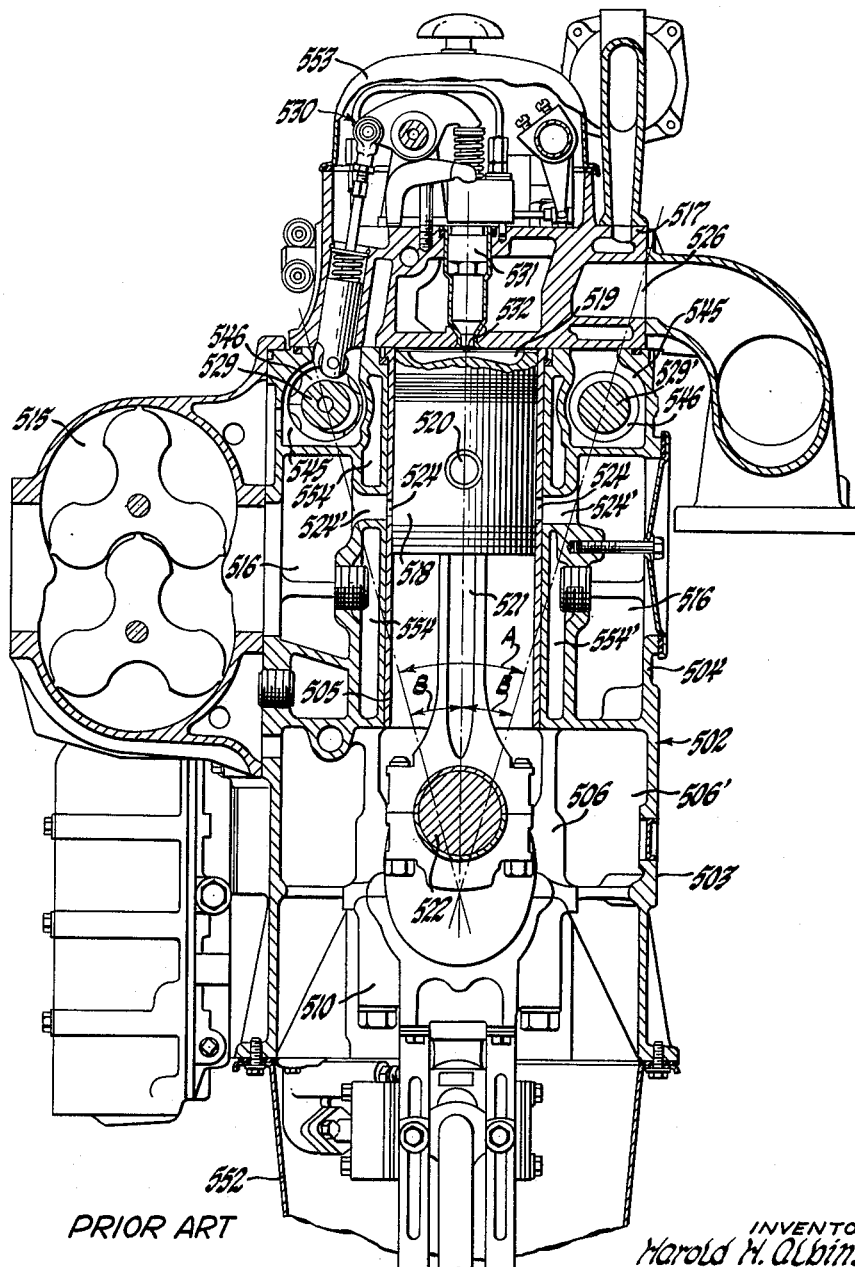
FIGURE 35 is a transverse sectional view of the engine of FIGURE 34 and is illustrative of the previous inline series of engines.

Referring more particularly to FIGURES 34 and 35 of the drawings, the six-cylinder inline engine shown therein is indicated generally by the reference numeral 501. This engine is illustrative of a series of two-cycle uniflow scavenged engines, including two, three and four-cylinder models, which are constructed in accordance with the teaching of the aforementioned Brecht patent. Each of the several inline engines comprises a substantially rectangular cylinder block 502 which is reversible end-for-end and includes a lower crankcase defining portion 503 and an upper cylinder defining portion 504, a cylinder head 517 which is reversible end-for-end on the upper face of the cylinder block, a front end plate 550 which may be secured to close either end of the cylinder block, a rear end plate 548 which may be similarly secured to either end of the block and reversed to provide alternative blower drive locations, a front balance weight cover 551, a timing gear and flywheel housing 549, an end-for-end reversible oil pan 552, and a cylinder head cover 553.

The several cylinder blocks each include a lower crankcase defining portion 503 and an upper cylinder defining portion 504. The crankcase defining portion of the cylinder block has a plurality of main bearing supporting arches 506 carried by webs 506' extending transversely and formed integrally therewith. These arches are located intermediate the several cylinders and adjacent the ends of the block. Bearing segments 511 and 512 are supported by the several arches 506 and bearing caps 510 secured thereto. These bearing segments rotatably support the main journal portions 513 of a crankshaft 514, the journal portions 513 being spaced longitudinally and extending intermediate several crankpin throws 522. The upper portion of the cylinder block defines an air box 516 and upper and lower central water jacket galleries 554 and 554' which embrace partition walls slidably supporting cylinder liners 505 of the dry wall type. A camshaft 529 and a balance shaft 529' are mounted in parallel galleries 545 which are defined by and extend longitudinally of the upper portion of the cylinder block in flanking relation to the cylinder row. These shafts are journaled within their respective galleries for counterrotation by a plurality of longitudinally spaced bearings 546 and carry engine balancing masses. An engine driven blower 515 is mounted on one side of the upper block portion and is adapted to supply pressurized scavenging and charging air to the block defined air box. Each cylinder liner has a circumferential belt of inlet ports 524 intermediate its ends. These inlet ports are alignable with arcuate ports 524' which extend through the water jacket defining portions of the block to the air box proper. The reversible cylinder head closes the upper end of the several liner defined cylinders, and pistons 518 reciprocably mounted in each cylinder liner cooperate therewith to define expansible combustion chambers 519.

Each piston is connected by a wrist pin 520 and a connecting rod 521 to the adjacent crankpin or throw 522 of the crankshaft 514. Reciprocation of the several pistons within their respective cylinders serves to control the admission of scavenging and charging air to each cylinder with uniflow scavenging of exhaust gases through overhead exhaust valves. The overhead exhaust valves, of which there may be two or four per cylinder, are reciprocably mounted in the cylinder head 517 and control the opening of ports leading to exhaust passages 526. An exhaust manifold 527 is symmetrical about the transverse median plane of the head and block for mounting on the side face 528 of the cylinder head. This manifold symmetry together with the reversibility of the cylinder head permits mounting of the exhaust manifold on either side of the engine. The manifold has branch passages mating with the several exhaust passages 526. Fuel injectors 531 mounted in the cylinder heads have nozzles projecting centrally of the expansible combustion chambers 519 of their respective cylinders and are adapted to controllably supply fuel charges thereto. The exhaust valves and the fuel injectors 526 for the several cylinders are operated in timed sequence by the camshaft 529 through cam following linkage mechanisms 530 of the overhead rocker type.

The camshaft 529 and the balance shaft 529' may be interchanged to accommodate reversal of the cylinder head in assembly to provide alternative exhaust manifold locations on either the right or left hand side of the engine. These shafts each carry appropriate balancing masses at the opposite ends thereof. The several balancing masses consist of weights 558 suitably secured to the front ends of the shafts. Equivalent weights are secured to the rear ends of these shafts in the form of driving gears 560 wherein the balancing mass is eccentrically disposed in 180° phased relation to the front weights. The gears 560 interengage to counterrotate their respective shafts and are driven through an idler gear 562 by a crankshaft mounted timing gear 564. Such rotation of the balance shafts is at crankshaft speed and in proper phased relationship thereto. The resultant horizontal forces acting on the balancing masses neutralize each other and the vertical forces acting thereon are additive to balance the primary inertia forces of the several reciprocating engine parts. If unbalanced, such primary inertia forces would apply a rocking couple tending to rock the engine about its transverse axis. The blower 515 is driven off the adjacent balance shaft driving gear 560. To accommodate either clockwise or counterclockwise rotation of the crankshaft and to maintain proper driving rotation of the blower, the idler gear 562 is journaled on a stub shaft 566 which may be mounted in one of two alternative positions wherein the idler gear engages either the right or left gear 560.

The shafts 529 and 529' and the galleries therefor are disposed in symmetrical parallel relation to a longitudinal median plane passing vertically through the axes of the crankshaft and the several cylinders, the center line distances between these two shafts and the crankshaft being equal. This results in engine geometry defining an included angle A between intersecting planes passing through and including the balance shaft and crankshaft axes. These planes similarly define two equal angles B with respect to the vertical median plane of the engine.

BASIC V ENGINE
Description of FIGURES 1–6

Referring now to the other drawings and more particularly to the transverse section of FIGURE 1, the V-type two-cycle uniflow scavenged internal combustion engine is indicated generally at 1 and comprises a cylinder block 2 having a lower crankcase defining portion 3 and an upper portion 4 mounting two V'd inline banks of cylinder liners 5. An oil pan member 52 is suitably secured to the bottom face of the block to enclose the crankcase portion thereof. Main bearing supporting arches 6 are longitudinally spaced and extend transversely of the crankcase portion of the block being supported relative thereto by webs 7 and 7' and struts 8, 8', 9 and 9'. Bearing segments 11 and 12 are supported by the several arches 6 and bearing caps 10 secured thereto and suitably journal longitudinally spaced main journal portions 13 of a crankshaft 14. An engine driven blower 15 is mounted on top of the cylinder block intermediate the cylinder banks and is adapted to supply pressurized scavenging and charging air to an air receiving box or chamber 16 which is defined by the cylinder block and extends longitudinally thereof between the V'd cylinder banks and laterally to embrace the several cylinders. Two cylinder heads 17 are mounted on the upper inclined faces of the cylinder block in flanking relation to the blower. The cylinder heads close the upper ends of the cylinder liners and cooperate with pistons 18 reciprocably mounted therein to define a plurality of expansible combustion chambers 19. A cylinder head cover 53 is secured to a peripheral flange 17' extending upwardly from the cylinder head and cooperates therewith to define a compartment housing overhead valve and fuel injector actuating rocker mechanisms.

A wrist pin 20 is carried by each of the several pistons and is pivotally connected to one end of a connecting rod 21. The opposite end of each connecting rod is drivingly journaled on a corresponding crankpin journal portion 22 of the crankshaft. The crankpin journal portions partially overlap the main crankshaft journal portions 13 and are supported therebetween by radially extending crankthrow webs 23. The several crankthrow webs may have counterbalancing masses formed integrally therewith for balancing rotating and reciprocating unbalance and for reducing the bearing loads imposed on certain of the main bearings. To permit the same longitudinal cylinder spacing between the several inline and V engines, two connecting rods are journaled in side-by-side relation on each crankpin 22 and are connected at their wrist pin ends to the pistons in transversely adjacent V'd cylinders of the two cylinder rows. To accommodate this side-by-side mounting of the two connecting rods on a single crankpin while maintaining the same longitudinal spacing and axial dimension of the several main bearings as in the several inline engines, the cylinders in one bank are preferably staggered slightly behind those of the other bank and the crank ends of the connecting rods are necessarily of reduced axial dimension. Within limits, the longitudinal dimension of the crankpin may also be increased by corresponding reductions in the web thickness of the several crankthrows. The main and crankpin journals and the bearings therefor must necessarily be of increased diameters relative to the corresponding journals of the inline engine crankshaft, however, to maintain main and crankpin bearing loads within acceptable peak and mean limits.

To insure proper clearance between the crankcase projecting ends of the cylinder liners of the V engines, the connecting rod connections to the several crankpins are preferably constructed as shown and described in the copending United States Patent No. 3,069,926 issued December 25, 1962, to Carl S. Hoffman and Kenneth L. Hulsing and entitled "Connecting Rod and Crankshaft Connection for Internal Combustion Engine."

Reciprocation of the several pistons serves to control the admission of scavenging and charging air to their respective cylinders through intake ports 24 opening to the air box 16 intermediate the ends of the cylinder liners. Four exhaust valves 25 per cylinder are reciprocably mounted in the cylinder heads and control the opening of ports leading to exhaust passages 26 which are in turn connected to exhaust manifolds 27 secured to the side faces 28 of the cylinder heads. The exhaust valves 25 for the several cylinders are operated in timed sequence by two spaced parallel camshafts 29 through valve actuating mechanisms 30 of the overhead rocker type. The sequential and simultaneous opening of the exhaust and intake ports thus provides uniflow scavenging of the exhaust gases from the several cylinders through exhaust passages 26. Fuel injectors 31 are mounted in the cylinder heads and each has a nozzle 32 projecting into the expansible combustion chamber 19 of an adjacent cylinder. The several injectors are adapted to controllably supply fuel charges to their respective cylinders in timed sequence as each piston approaches its top dead center position therein by actuation of a conventional valve or pump controlling plunger by camshaft operated rocker arms 34.

The valve actuating mechanisms 30 are of the type adapted to open and close the valve in pairs and are preferably of the form shown and described in copending United States Patent No. 3,021,826 issued February 20, 1962, to Albert DeFezzy, George P. Hanley, William S. Kenyon and Joseph A. Peak and entitled "Rocker Arm and Multiple Valve Actuating Mechanism." These valve actuating mechanisms each include a clevis bridge member 35 which is pivotally connected at 36 to one end of a rocker arm 37 and has two pallet arms thereon thrustably engageable with the adjacent ends of two of the exhaust valves 25. The several rocker arms 34 and 37 for the injector and exhaust valves of each cylinder are pivotally supported on a shaft 38 which is in turn supported by spaced bracket members 39 carried by the cylinder heads. The ends of the rocker arms distal from the valve stems and the injector plungers are each pivotally connected at 49 to the upper end of a rod assembly 40. The several push rod assemblies 40 are adjustable to compensate for lash in the valve and injector actuating mechanisms. The push rod assemblies 40 each include a cam follower guide member 41. These guide members are reciprocably and non-rotatably mounted in suitable guide bores extending through the cylinder head and carry rollers 42 engageable with suitable valve and injector actuating cam lobes 43 and 44 spaced longitudinally of the camshafts. As shown, the several push rod assemblies 40 are each spring biased downwardly to maintain the several rollers in engagement with their respective valve actuating lobes.

The two camshafts 29 are mounted in spaced parallel galleries 45 which are defined by and extend longitudinally of the cylinder block inboard of and adjacent the upper portions of each of the cylinder banks. The camshafts are journaled within their respective galleries by a plurality of longitudinally spaced bearings 46. The bearings 46 are preferably of the type shown and described in copending United States Patent No. 2,956,642 issued October 18, 1960, to Albin Chaplin and Edward A. Chapin and entitled "Camshaft and Bearing Lubricating Means." In accordance with the instant invention, the axes of the two camshafts and their mounting galleries are located to provide the same spaced relationship between each other and the crankshaft axis as that existing between the camshaft, balance shaft and crankshaft of the inline engine. This results in an engine configuration wherein two planes passing through and including the camshaft and crankshaft axes define an angle A which is equal to that defined by similar planes passing through the corresponding shaft axes of the inline engine. Similarly, the planes passing through and including the camshaft and crankshaft axes and through the center lines of the cylinder of each bank define angles B which are equal to that defined by corresponding planes passing through the shaft axes and cylinders of the inline engine. This geometry results in the angle A being necessarily equal to the sum of the two angles B. In the illustrative embodiment of FIGURE 1 and the inline engines of FIGURES 34 and 35, the angle A is equal to 32° and the two angles B are each equal to 16°. The cylinder banks of the resultant V engine are thus inclined at an included angle of 64°.

This geometry of the several V engines permits the use of interchangeable accessory timing gear drive components between the several inline and V engines. This is best seen by reference to FIGURES 2-4. The peripheral dimensioning of the rear face of the several V engine cylinder blocks is the same as for the several inline blocks and serves to mount a rear end plate 48 and a timing gear flywheel housing member 49 which are also interchangeable with the inline engine. The end plate 48 cooperates with a recess 68 formed in the adjacent end of the block to define an upwardly extending breathing passage connected at its lower end to the crankcase and terminating in an outlet port 69 extending through the blower mounting deck of the block. As in the inline engine, the accessory drive and timing gear system includes a crankcase mounted timing gear 64, an idler gear 62 and counterrotating camshaft driving gears 60.

As indicated at 63 in FIGURES 3 and 4, alternative starter units may be provided on opposite sides of the flywheel bell housing. These alternative starter drive units are drivingly engageable with the crankshaft-carried flywhel 64 to provide either clockwise or counterclockwise rotation of the crankshaft as viewed from the rear of the engine. To maintain proper driving rotation of the blower and camshafts, the rear of the cylinder block and the end plate 48 are provided with alternative mounting positions at 67 and 67' for the idler supporting stub shaft 66. Locations for mounting various engine and vehicle accessories are provided in the end plate and gear housing at 76, 76', 78, 78', and 83, 83', respectively. Again as best seen in FIGURES 3 and 4, optional accessory gears 77, 79 and 84 mounted in these locations are driven off the camshaft driving gears 60. One of the two accessory gear locations 76 or 78 would be used for the blower gear drive in the inline engine. The several openings 60', 60', 76', 78' and 83' provided in the timing gear housing for access to the corresponding gears are normally closed by suitable cover plates 60'', 60'', 76'', 78'' and 83'', as shown in FIGURE 6, or by appropriate gear driven accessory mechanisms.

The gears 60 each embody offset and phased balancing masses and are drivingly secured to the rearwardly projecting ends of the two camshafts 29. The distal ends of the camshafts project beyond and are suitably sealed with respect to an end plate 50 closing the upper front portion of the cylinder block. These forward ends of the camshafts also carry balancing masses which are properly phased with respect to each other and disposed at 180° to the balancing mass concentration of the driving gears 60. In the illustrative six-cylinder V engine of FIGURES 2 and 5, these forward balancing masses are formed integrally of accessory driving V-belt pulleys 58, one of which drives a water cooling pump 70 suitably supported by an engine mounted bracket member 70'.

In the several V engines, the journal shafts 81' and 81'' and the mating impellers 81 carried thereby of the Roots type, positive displacement blower 15 are drivingly interconnected by synchronizing gears 80 and connected through a torsional vibration isolating and alignment accommodating coupling 82 to the accessory driving gear 84 and therethrough to the right camshaft driving gear 60 looking forwardly of the engine as shown in FIGURES 2-4. An engine governor 85 is secured to the forward end of the blower and the speed responsive mechanism thereof is drivingly connected to the forward blower impeller shaft 81'. The speed and power controlling output of the governor is connected through suitable linkages, partially indicated at 86, to the fuel supply regulating racks 87 of the several fuel injectors. A gear type fuel pump 88 is secured to the front of the governor housing. The driving shaft of this pump is in substantial alignment with and drivingly connected to the other forward impeller shaft 81''. This pump delivers pressurized fuel through suitable filters and piping, not shown, to fuel distribution manifolds 89 which are preferably formed integrally of the cylinder head. Referring briefly to FIGURE 1, the supplied pressurized fuel is distributed from the manifolds 89 to the several fuel injectors 31 through branch conduits 90. The surplus fuel thus delivered is circulated through the fuel injectors for cooling purposes and returned through branch conduits 91 to fuel return manifolds 92 which are also preferably formed integrally of the cylinder head and connected to the pump intake side of the engine fuel system.

The combined blower, governor and fuel pump drive briefly described above is shown and described in greater detail in copending United States Patent No. 3,088,446, issued May 7, 1963, to William R. Fox and Harvey G. Humphries and entitled "Combined Engine Accessory Drive and Housing Therefor."

The cooling systems of the several V engines are discussed in greater detail blow with reference to FIGURES 7-23, but are briefly of a full-flow and by-pass blocking type protecting the engine from excessive restriction of coolant flow during high load operation under cold weather conditions. In the illustrative engine shown in FIGURE 5, the cooling water pump 70 is driven off the adjacent balance weight pulley through a plurality of V belts. This pump has an inlet port 71 connectable to the water outlet of the engine radiator, not shown. Two branch inlets 71' and 71'' are connected through conduits 72' and 72'', respectively, to the by-pass outlets of two thermostatic valve units 73' and 73'' which are of a suitable full-flow by-pass blocking type. These thermostatic valve units are mounted on and serve as water outlets from water jacket galleries extending longitudinally of each head. The radiator connectable outlets for these thermostatic units are indicated at 74' and 74''. The discharge outlet 75 of the pump 70 is connected through a discharge conduit 93 to an oil cooler unit 94. From the oil cooler, the cooling water passes into the water distribution passages and jacket galleries of the cylinder block and head through an elbow 95.

The operation and large by-pass capacity of the several cooling systems provides modulation of water temperatures into the cylinder block and substantial equalization of coolant flows and temperatures through the two cylinder blanks. Since each bank has its own thermostatic valve and housing tied into the common full-flow radiator by-pass, complete closure of one thermostatic valve with the other open results in a slight division of pump delivery between the banks, e.g. 56% versus 44%. This variance in fluid flow through the two banks tends to equalize the two water outlet temperatures and thus the thermal response of the two thermostatic valves to equalize the distribution of coolant flow through the two banks.

The oil cooler unit 94 may be secured to either side of the crankcase defining block portion 3 adjacent the front thereof with an adapter plate 101 being mounted therebetween. The adapter plate 101 also serves to mount a full-flow oil filter unit 97. The adapter plate has a passage 102 communicating between the oil inlet of the oil filter unit and a port 103' opening to a block-defined passage 103 which is connected to the discharge pressure outlet of a crankshaft-driven gear pump indicated at 96. From the oil filter unit, the oil passes through a second passage 104 in the adapter plate to the oil cooler unit and therefrom through aligned mating ports 105 and 106 in the plate and side of the cylinder block, respectively. The dimensioning and configuration of the ports 103' and 106 and the plate and cooler mounting side faces of the several V engine blocks correspond to the several inline blocks to provide maximum interchangeability of those accessory units between the several engines. The port 106 opens on a vertical leg 107' of an oil distribution manifold or passage 107 extending transversely of the cylinder block. The bore of passage leg 107' is aligned with the passage 103 but separated therefrom by a plug 108. At its upper end the passage leg 107' intersects a second passage leg 107" which extends obliquely upwardly to a main oil distribution gallery or passage 110 which extends longitudinally of the engine and block between the V'd cylinder banks. To accommodate mounting of the oil cooler and filter unit on either side of the engine, the passage portions 103, 107' and 107" are duplicated, except for the omission of the plug 108, to provide symmetry about the vertical median plane of the engine. Similar oil distribution passage symmetry may also be provided adjacent the rear of the block to provide additional alternative oil pump cooler and filter locations. The pressure of the oil as supplied by the oil pressure pump to the oil filter and cooler units is regulated by a pressure regulating valve 111 closing the bottom opening of the passage 103 and the oil gallery pressure is regulated at a somewhat lower pressure level by a second regulating valve 112 closing the bottom opening of the opposite passage 103. As described in the aforementioned copending Patent No. 3,069,926, the main oil gallery 110 supplies lubricating oil to the several crankshaft bearings through branch passages in the bearing supporting struts and webs and passages in the crankshaft carry the lubricating oil to the connecting rod journals in a conventional manner. The main oil gallery is also in communication with galleries 143, 144 and 145 extending longitudinally of the cylinder block, the camshafts and the cylinder heads for lubrication of the camshaft bearings, cam lobes and the injector and valve actuating mechanisms through suitable branch passages as set forth in greater detail in the aforementioned United States Patent No. 2,956,642 to Chaplin et al.

CYLINDER BLOCK CONSTRUCTIONS

Description of FIGURES 7–10 and 12–14

As indicated above, the cylinder block shown in transverse section in FIGURE 1 is illustrative of and embodies certain of the broader as well as more specific aspects of the invention. As shown in greater detail in FIGURES 7–10, this cylinder block construction includes an angled deck or partition wall 113 extending between the crankcase portion of the block and the lower wall of the engine air box 16. This angled deck extends transversely and longitudinally between the front, rear and side walls of the block 114, 115 and 116, respectively, and intersects and laterally supports the bearing arch supporting webs 7, 7' and struts 8, 8', and 9 and 9'. A plurality of ports 117 extend through the angled deck and are defined in part by cylindrical muffs or flanges 118 extending upwardly from the angled deck. These muffs serve to support the lower ends of the V'd cylinder liners 5 in slidable and sealed relation thereto. The angled deck is reinforced at its apex intermediate the cylinder banks by the longitudinally extending boss or ridge defining the main oil gallery 110.

Two water-jacket-and-camshaft-gallery defining portions 119 extend longitudinally of the upper portion of the block and support the upper ends of the several cylinder liners. These upper liner supporting portions are structurally joined to each other by a blower mounting deck 120 and reinforcing ribs 121 which extend transversely thereof adjacent each end of the blower. The blower end plates 149 are secured to the ribs 121 by suitable bolts 150 and support the main blower housing member 151 therebetween. The main blower housing member is also directly secured to the blower mounting deck 120 by inclined bolts 152. In the assembled engine, this mounting of the blower contributes substantially to the rigidity and strength of the upper block portion intermediate the two cylinder banks. The end plates 48 and 50 also serve to structurally interconnect the upper block portions 119 and substantially increase the rigidity of the upper block in the assembled engine with a minimum of metal weight.

Each upper liner supporting portion 119 is connected to the lower crankcase defining deck 113 by the front, rear and adjacent side walls of the block and by a plurality of arch defining struts or columns 122, 123, 124, 125, 126 and 127 which extend therebetween adjacent each end of the block and intermediate each cylinder. The side walls 116 of the block are perforated to provide ports 128 for air box and cylinder port inspection. Suitable cover members 128' normally close these ports as shown in FIGURE 1. The several struts 122–127 are co-extensive with the bearing arch supporting struts 8, 8', 9 and 9' of the crankcase portion and extend through the upper block portions 119. Adjacent their upper ends these struts are bored and tapped to receive cylinder head mounting bolts indicated at 138 in FIGURES 1, 9 and 11.

As best seen in FIGURES 8 and 9, each strut 126 is provided with a drilled passage 139. At its lower end, each passage 139 intersects the laterally extending oil distribution manifold 107 adjacent the rear of the block. At its upper end, it communicates with the oil distribution gallery 145 of the cylinder head through a mating passageway, not shown. At the rear of the block, two additional struts 140 extend between and have drilled passages 141 therein interconnecting the oil distribution galleries 110 and 143. Each passage 141 communicates through ports in the rear camshaft bearing and mating radial passages in the camshaft to the camshaft-defined oil distribution gallery 144. The longitudinal oil galleries 143 may extend completely through the block. However, in the instant block construction these galleries are divided to provide rear and front gallery portions 143' and 143". At the front of the engine, the camshaft distribution galleries 144 communicate through ports in the camshaft and camshaft bearing and drilled passages 142 in the block to the forward portions 143' of the block defined galleries 143. The rear and front galleries 143' and 143" communicate through drilled passages 146 and 147 extending obliquely through the blower mounting deck 120 and the ribs 121 to supply oil to suitable distribution passages 148 provided in the blower end plate 149.

Struts 153 and 154 extend between the angled deck 113 and the cylinder head mounting decks 130. These struts are immediately adjacent the struts 123 and 127 and define oil drain passages 155 and 156. These drain passages 155 and 156 interconnect the crankcase with longitudinally extending oil drain manifold recesses 157 which extend longitudinally of and open on the cylinder head mounting surface of the upper deck 130. The manifold recesses 157 mate with oil drain passages 158 which extend through the cylinder head 17 adjacent each end thereof and intermediate the exhaust passages 26. The several oil drain passages 155, 156 and 158 and the drain manifolds 157 are of a size to provide partial-full oil drainage therethrough under all engine operating conditions. Such partial-full drainage deaerates the draining oil and provides breathing communication between the rocker cover compartment and the crankcase through these passages. Oil drainage and breathing communication between the rocker cover compartment and the crankcase is also provided through ports 159 and recesses 160 extending through the cylinder head. The recesses 160 mate with openings 161 to the camshaft galleries 45, the several compartments of which are interconnected for drainage and breathing in the manner described in the aforementioned United States Patent No. 2,956,642. At the front of the block the camshaft galleries 45 communicate with the crankcase through suitable passages defined between the front end plate 50 and suitable recesses indicated at 161 in FIGURE 8. At the rear of the engine the camshaft galleries communicate through aligned ports in the block end wall and the end plate to the flywheel housing.

Each upper block portion 119 defines a central water jacket gallery 54 extending longitudinally of and embracing the upper combustion chamber ends of the several cylinders of its respective cylinder bank. Each gallery 54 is defined between the upper cylinder head mounting deck 130 and a lower deck or web 131 partitioning the water jacket from the air box. Cylindrical jacket walls or muffs 132 extend between the decks 130 and 131 in spaced axial alignment with the lower muffs 118 and support the upper ends of the several cylinder liners in slidable sealed relation thereto. Inwardly of the block, the jacket galleries 54 are defined by the camshaft mounting galleries 45. Two water distribution galleries or manifolds 55 extend longitudinally of the portions 119 outboard of the cylinder rows and communicate laterally with the jacket galleries through arches defined by the struts 123, 125 and 127. The longitudinally extending water distribution manifolds 55 and water jacket galleries 54 of the two banks are interconnected across the front of the block by a cross-over gallery or manifold 56 partially shown in FIGURES 1, 8 and 9. As shown in FIGURES 9 and 10, the jacket galleries also communicate with the distribution galleries 55 at the rear of the block through transversely extending branch passages 55' and arches defined by the struts 126 and 127. The cooling water passes out of the water jacket galleries 54 through ports 129 which extend through the cylinder mounting deck 130 intermediate the transversely aligned struts 122–127. The ports 129 mate with corresponding water inlet ports extending through the combustion chamber defining deck of the cylinder head 17 as shown in FIGURE 11.

It will be seen that the several longitudinally extending camshaft mounting galleries 45 and the water jacket and distribution galleries 54 and 55 and the structural reinforcement and interconnection of the decks 130 and 131 by the several struts and liner supporting muffs provides a relatively light but extremely rigid box girder construction for the upper liner supporting portions 119. This rigidity of the upper liner supporting portions, of course, contributes substantial rigidity to the overall block construction. In the illustrative block embodiments of FIGURES 1 and 7–9, rigid box girder construction is also provided for the lower liner supporting block portions. This permits a further reduction in block weight and is accomplished by having two gusset decks or partitions 133 which extend longitudinally of each cylinder bank and structurally interconnect and reinforce the upper ends of the several lower liner supporting muffs 118 with the several struts 122–127. These gusset decks divide the laterally extending portions of the air box into upper and lower portions 16' and 16". Ports 134, 135, 136 and 137 extending through the gusset deck interconnect these lateral air box portions adjacent the rear and side walls of the engine to insure even distribution of the pressurized scavenging and charging air to the intake ports of the several cylinders.

From the foregoing description of the cylinder block construction, it will be noted that the water jacket cooling provided is limited to the combustion chamber ends of the several cylinders above their respective intake ports 24. This is in contradistinction to the usual two-cycle engine water cooling practice wherein the cylinders are jacketed over substantially their entire length as in the Brecht patent. Relatively unrestricted water flow and even distribution is provided through the water jacket and distribution galleries 54, 55 and 56 of the instant block constructions. With such flow characteristics, the provided limited jacket cooling has been found sufficient and more evenly distributes the thermal loads imposed on the several cylinder liners. The air intake port and lower muff supported portions of the cylinder liners are adequately cooled by the flow of the pressurized scavenging air through the air box and into the several cylinders. The direct air cooling of the intake port belt region of each cylinder liner is augmented by conduction upwardly to the water jacketed and upper muff supported portion of the liner and downwardly to the lower muff supported liner portion where the gusset deck provides additional heat transferring surface immediately adjacent thereto. This limited jacket cooling has further advantages in reducing the required coolant capacity, and hence engine operating weight, and in permitting the use of a coolant circulating pump of reduced capacity and size.

An alternative wet-liner form of cylinder block is illustrated in FIGURES 12, 13 and 14. This cylinder block construction is necessarily slightly heavier than the dry-liner construction described immediately above to provide the same rigidity and load characteristics. However, the wet-liner construction has the advantages of being somewhat easier and hence more economical to core, cast, clean and inspect. With the exception of the water jacket structure and the structure supporting the lower portions of the several liners and the crankshaft bearing arches, this wet-liner block construction is essentially the same as the dry-liner construction and these alternative cylinder block constructions are interchangeable in the several engines. Hence, reference numerals for identifying corresponding portions of this modified block construction have been obtained by the addition of 600 to the several reference numerals used in describing the previous block embodiment. The last two digits of such corresponding reference numerals are thus the same. By way of example, the cylinder block is identified by the reference numeral 602 and the upper liner supporting block portions are identified by the reference numerals 719. Such corresponding structure need not be discussed in detail and the following discussion is limited to the above-indicated differences in structure.

The several crankshaft bearing supporting arches 606 are supported by partition webs 607 extending transversely between the crankcase defining angled deck 113 and the side walls 716 of the lower block portion 603. The webs 607 are reinforced radially of the bearing supporting arches by strut defining bosses 608, 609 and 609'. The several bosses 608 are coextensive with the struts 722, 724 and 726 of the upper block portion 604 and the bosses 609 and 609' are co-extensive with the struts 723, 725 and 727. At its lower end, the somewhat thicker cylinder liners 605 are slidably supported cylindrical flanges or muffs 718 and are sealed with respect thereto by an O-ring seal 717'. The muffs 718 are of somewhat heavier section and of shorter axial length than the corresponding muffs of the previous embodiment. As best seen in FIGURES 13 and 14, the several muffs 718 merge with the adjacent struts 722–727 and with each other intermediate the several cylinders to increase the structural rigidity and load distributing characteristics of these portions of the block. The struts 725 are also reinforced intermediate their ends by small gussets 733 tying them to the side walls of the block in the air box region.

As indicated above, the wet liner jacketing of the upper liner portions is the most salient difference between this block construction and that previously described. The spaced water jacket defining decks 730 and 731 each have a plurality of ports 730' and 731' which are coaxial with the ports 717 defined by the lower liner supporting muffs 718 and the angled deck 713. The ports 730' and 731' slidably support the upper combustion chamber ends of the several cylinder liners 605. The liners are sealed with respect to the ports 731' by two O-ring seals indicated at 731". The upper flanged end of each liner is sealed with respect to its upper mounting port 730' by abutment with the annular block defined limit flange 730" as well as by the cylinder head gasket. The liners 605 thus cooperate with the several struts 722–727 and the cam shaft galleries to define a plurality of interconnected water jacket compartments which embrace the upper ends of the several cylinders and define water jacket galleries 654 extending longitudinally of their respective cylinder banks. As in the previous embodiment, these water jacket compartments are connected to longitudinally extending water manifolds 655 through arches defined between the struts 723, 725 and 727 at the side of the block. The rear jacket compartment of each bank is also connected through an arch defined between the struts 726 and 727 to the water manifold through a branch 655' extending transversely therefrom at the rear of the block. The absence of the upper muffs in this wet-liner block construction provides somewhat greater fluid flow clearances in the water jacket compartments. However, to provide rigidity corresponding to that imparted by the upper liner supporting muffs in the previous embodiment, the several arch defining struts 722–727 are necessarily of somewhat increased section. Reinforcing partition webs 732 also interconnect the decks 730 and 731 intermediate the several cylinders of each bank and the struts 724 and 725 to impart additional rigidity to the upper block portions 119. The partition webs 732 serve the further purpose of restricting cooling water flow longitudinally of the cylinder jacket gallery.

CYLINDER HEAD CONSTRUCTION

Description of FIGURE 11

As indicated above, each cylinder head 17 is reversible end-for-end to permit its use on either bank of the several V engines and to provide alternative engine profile configurations in the several inline engines; the cylinder heads of two, three, four and six-cylinder inline engines being interchangeably used on the four, six, eight and twelve-cylinder V engines. As will appear later, the four and six-cylinder heads are also usable on sixteen and twenty-four-cylinder compound V engines which evolve from certain aspects of the invention. To provide the necessary end-for-end reversability for such head interchangeability, each cylinder head 17 is symmetrical about its transverse median plane. This is best seen in FIGURE 11 which illustrates a cylinder head constructed in accordance with the invention with an intermediate portion thereof being broken away.

The cylinder heads 17 each comprise a lower deck 162 mating with and suitably sealed with respect to the upper deck 130 of the cylinder block. The lower deck 162 thus cooperates with the upper ends of the several cylinder liners to define the stationary closed ends of the combustion chambers 19. A plurality of exhaust valve seat defining ports 26' extend through the lower deck and open on the several combustion chambers in angularly spaced relation about ports 31' which mount the nozzle ends of the several fuel injectors 31, the several nozzles extending centrally into each combustion chamber. An upper deck 163 is connected to the lower deck 162 by end walls 164 and side walls 165 and 166. The upper deck 162 carries the flange 17' mounting the rocker cover 53 and cooperates therewith to define the compartment housing the valve and injector actuating mechanisms. Within its flange defined portion, the upper cylinder head deck 163 mounts the various valve and injector actuating mechanisms and has a plurality of bores 25' extending therethrough in axial aligment with the valve seat ports 26'. The bores 25' serve to support guide bushings for the several exhaust valves 25. Centrally of each cluster of valve mounting bores 25', the cylinder head upper deck is also provided with a bore 31" for mounting the upper barrel end of the fuel injector 31, each of the bores 31" being in alignment with a lower deck defined bore 31'. In addition to the side and end walls, the upper and lower decks 163 and 162 are structurally interconnected by a plurality of columns or struts 122', 123', 124', 125', 126' and 127'. These struts are alignable with the corresponding struts in the cylinder block structure and each have bores extending therethrough and receiving the cylinder head mounting bolts 138. The several struts 123', 125' and 127' also define the cylinder head oil drain passages 158 which interconnect the rocker cover compartment with the oil drain manifold defined by the block recess 157. The upper and lower decks 163 and 162 are also structurally interconnected by the exhaust passages 26 and the supporting web structure 170, 170' therefor.

The side wall 165 defines the longitudinally drilled fuel oil distribution manifolds 89 and 92 and guide bores 41' for the several cam follower guides. A partition wall 167 extends longitudinally of the cylinder head intermediate the struts 122', 124' and 126' in spaced parallel relation to the side wall 165. Partition webs 167' extend laterally from the struts 124' to the side wall 165 and divide the space intermediate the end walls 164, the side wall 165 and the partition wall 167 into the several oil drain recesses 160 which, as indicated above, are connected to the rocker cover compartment through ports 159 and 159' extending through the upper deck 163. The ports 159 and 159' open to oil collecting recesses 160' opening to the upper surface of the deck 163. The partition wall 167 cooperates with the upper and lower decks, the end walls 164, the exhaust passage supporting webs 170, 170' and the struts 123', 125' and 127' to define a water jacket gallery 168 which extends longitudinally of the head and embraces the several exhaust passages 26 and the fuel injectors 31. That portion 163' of the upper deck extending beyond the cover mounting wall 17' cooperates with the side wall 166, the struts 125', 123' and 127' and the exhaust passage supporting web structures 170, 170' to define an internal water manifold 171 extending longitudinally of the cylinder head and embracing the manifold connected ends 26' of the exhaust passages 26.

As indicated above, the cooling water enters the cylinder head water jacket gallery 168 through ports aligned with the outlet ports 129 of the cylinder block water jacket galleries 54. These water inlet ports mount water distribution nozzles 129' and 129", the nozzles 129' being located intermediate the struts 124' and 125' and the nozzles 129" being located intermediate the struts 122', 123', 126' and 127' adjacent each end of the cylinder head. These nozzles direct the incoming cooling water on the adjacent valve seating ports and branches of the exhaust passages 26. Partition webs 169 located intermediate the paired struts 124' and 125' and the nozzles 129' extend between the lower and upper decks and divide the cylinder head jacket gallery into a plurality of compartments. These partition webs 129 thus serve to restrict cooling water flow longitudinally of the cylinder head gallery and cooperate with exhaust passage supporting webs 170 to direct a substantial portion of the cooling water delivered to each jacket compartment upwardly around the exhaust passages and the fuel injector barrel and hence laterally to the internal water manifold 171 on the exhaust manifold mounting side of the cylinder head.

In the several V engines, the internal water manifold 171 is connected at the front of the head through an enlarged core plug opening 172 to the inlet chamber 184 of the thermostatic valve unit 73 mounted on the front face of the cylinder head. The port 172 is so located and of a size to vent the upper portions of the cylinder head jacket gallery, thus preventing the formation of flow restricting air and steam pockets. In the relatively shorter three and four-cylinder heads used on the six and eight-cylinder V engines, sufficient cooling water flow may be achieved through the internal manifolds 171 and the front outlet ports 172. In certain V engine applications, however, such as in the twelve and sixteen-cylinder engines of FIGURES 17 and 23, insufficient cooling water flow is provided by the internal water manifolds 171 and the front outlet ports 72 and external water manifolds 100, 300 or 500 must be used as shown in FIGURES 1, 17 and 23, respectively. In the inline engines, external water manifolds must be used also due to the location of the shaft driven front balance weights 58. To provide interchangeable use of the several heads between the several inline and V engine models, the upper deck portion 163′ of each cylinder head is cast with a plurality of bosses 98′ which close off the ports 98. In those engine installations requiring the use of external water manifolds, the bosses 98′ are machined off thus opening the ports 98 and providing mounting pads for the several inlet branch legs 100′ of the manifolds 100. In the several inline engines, the ports 98 thus provide the sole water outlets from the cylinder head. In the several V engines requiring external water manifolds, the ports 98 are used in conjunction with and are supplemented by the front water outlets 172.

ALTERNATIVE V AND INLINE ENGINES

Description of FIGURES 15 and 16

The wet-liner block construction shown in the transverse engine section of FIGURE 15 is essentially the same as that described above with reference to FIGURES 12–14. Hence, the same reference numerals have been used to identify the corresponding block portions. The various engine components shown also correspond to those previously described and are identified by reference numerals similarly obtained by adding 600 to the several reference numerals used in describing the engine of FIGURE 1. By way of example, the camshafts of the instant engine are identified by the reference numeral 629 and the oil galleries extending longitudinally therethrough are identified by the reference numerals 744. Such common structure need not be discussed in detail and the following discussion is limited to certain minor differences over the previously described engine and cylinder blocks.

In the block construction of FIGURE 15, the lower liner supporting muffs 718 are structurally reinforced by webs 718′ extending radially therefrom to the angled crankcase defining deck 613. The water jacket galleries 654 are also interconnected adjacent the front and rear of the block by two parallel cross-over passages 656. The passages 656 are in lieu of the cross-over manifold 56 interconnecting such galleries and the longitudinally extending distribution galleries of the previously described block embodiments. Use of these cross-over passages between the water jacket galleries has been found possible due to the temperature equalizing characteristics provided by the full-flow bypass cooling system including the use of separate thermostatic valves controlling the outlets from the cylinder banks. This absence of a relatively large cross-over manifold at one end of the engine permits the overall length of the engine to be somewhat shorter and minimizes the lengthening of the block imposed by the cylinder offset. The relatively deep transversely extending ribs 621 defining the cross-over passages 656 also serve to increase the structural rigidity of the upper portion of the cylinder block.

In the somewhat smaller V engine embodiment of FIGURE 15, the camshafts 628 are of a barrel type to permit the use of relatively thin wall plain bearing sleeves 646 which are finished within suitable mounting bores spaced longitudinally of the camshaft galleries 645. Adequate oil drainage and breathing from the rocker cover compartment is provided through the camshaft galleries by means of ports 645′. The several ports 645′ are located inboard and immediately adjacent to the several camshaft bearing mounting bores and serve to interconnect the several camshaft gallery compartments defined between the bearings 646. Ports 645″ extend through the front and rear end walls of the block to provide suitable oil drainage and breathing through front end plate defined passages and through the rear end plate and timing gear housing to the engine crankcase. As shown in FIGURE 15, the several drain ports 645′ and 645″ are preferably located so as to retain a cam lobe immersing oil level within the several compartments during engine shut down period, thus assuring adequate bearing and cam follower lubrication during engine starting periods.

As in the previously described engine embodiment, planes including the axes of the camshaft and crankshaft are disposed symmetrically of the vertical median plane of the engine and thus define equal angles D therewith and an included angle C with respect to each other. In accordance with the broader aspects of the engine, the planes passing through the camshaft and crankshaft axes also define equal angles D with planes passing through and including the cylinder axes of the adjacent bank. In the instant V engine embodiment, the angle C is equal to 34° and the angles D are equal to 17°. Thus, the angle included between the two cylinder banks of this invention is 68° which is in contrast to the 64° included angle of the previously described engine.

In the following description of the inline engine shown in partial transverse section in FIGURE 16, the various components and portions thereof are identified by reference numerals obtained by adding 800 to the reference numerals used in describing the corresponding components and portions of the V engine of FIGURE 1. By way of example, the instant inline engine is identified generally by the reference numeral 801.

In accordance with the broader aspects of the invention, this inline engine section is typical of the series of inline engines derived from and having component and machining interchangeability with the series of V engines shown in FIGURE 15. Accordingly, the intersecting planes passing through the axes of the camshaft 829, the crankshaft 814 and the balance shaft 829′ define equal angles D with respect to the vertical median plane of the engine and have the same included angle C with respect to each other as defined by corresponding intersecting planes passing through the camshaft and crankshaft axes of the V engine of FIGURE 15.

As in the Brecht patent, the camshaft 829 and balance shaft 829′ may be interchanged to permit end-for-end reversal of the cylinder head 817 to provide alternative exhaust manifold locations for different engine models. However, as shown and described in greater detail in United States Patent No. 3,094,190, issued June 18, 1963, to George W. Conover, Kenneth L. Hulsing and Joseph Koehler and entitled "Two-Cycle Inline Engine," the cylinder block of this inline engine has substantial symmetry about its longitudinally extending vertical median plane and provides alternative accessory mounting locations on either side thereof for different engine models. This is in contradistinction to the Brecht engine wherein the block is reversible end-for-end to provide alternative accessory mounting locations on either side of the assembled engine.

The cylinder blocks for this series of inline engines also incorporate those several feature of the V engine blocks which contribute to engine operating efficiency, which provide a block of minimum weight and substantial rigidity, a block which is easily and economically cored, cast, cleaned, machined, inspected and which provides improved engine cylinder cooling. These inline cylinder blocks 802 comprise a lower crankcase defining portion 803 and an upper cylinder supporting portion 804. These portions are separated by a deck 913 which extends transversely and longitudinally thereof between the front and rear and side walls 816 thereof. A plurality of main bearing supporting webs 807 extend transversely of the lower side walls 816 and the deck 913. These webs are structurally reinforced by vertically extending columns or struts 808, 809 and 809' formed integrally therewith. As in the V engines previously described, the upper ends of the several cylinders are supported by a longitudinally extending water-jacket-and-camshaft-gallery defining portion 919. This upper portion is connected to the lower crankcase defining deck 913 by the front, rear and the adjacent side walls 816 of the block and by a plurality of arch defining struts 924 which extend therebetween adjacent each end of the block and intermediate each cylinder. A plurality of ports 917 extend through the crankcase defining deck 913 and are defined in part by cylindrical muffs or flanges 918 which extend upwardly therefrom to support the lower ends of the cylinder liners 805. These lower liner supporting muffs are structurally reinforced by webs 918' which extend radially to the crankcase defining deck 913. Similar reinforcing webs may extend to the adjacent vertically extending columns or struts 924.

The upper block portion 819 defines a central water jacket gallery 854 which extends longitudinally of and embraces the upper combustion chambers of the several cylinders. The water jacket gallery 854 is defined between two longitudinally extending decks 930 and 931 and flanked by two longitudinally extending galleries 845 which alternatively mount either the camshaft 829 or the balance shaft 829'. Two water distribution galleries 855 extend longitudinally of the block immediately below the camshaft galleries 845 being separated from the engine air box 816 by the liner supporting deck 831. These water distribution galleries are in communication with the water jacket gallery through a plurality of ports 855' which extend therebetween intermediate the several cylinders. Cooling water is introduced into either of these water distribution galleries at the front of the block from the water outlet of the adjacent oil cooler which, as indicated above, may be mounted alternatively on either side of the block. As in the previous V engine embodiment of FIGURE 15, adequate oil drainage and breathing is provided through the camshaft and balance shaft galleries by means of ports 845' which interconnect the several gallery compartments intermediate the several shaft bearings 846. These ports are located immediately adjacent to and outboard of the several bearing mounting bores.

EXTERNAL ENGINE CONFIGURATIONS

*Description of FIGURES 17–23*

The twelve-cylinder V engine shown in side and front elevation FIGURES 17, 18 and 19 is basically similar to the six-cylinder V engine shown and described with reference to FIGURE 5 except for the use of a gear driven water pump, external water manifolds and the by-pass water connections provided therebetween through the cylinder head mounted thermostatic valve units. Accordingly, the various components and portions thereof are identified in the following description by reference numerals obtained by adding 200 to the numerals used in describing the corresponding components and portions of the previously described six-cylinder engine. By way of example, the twelve-cylinder V engine of FIGURES 17–19 is identified by the reference numeral 201 and the gear driven pump therefor is identified by the reference numeral 270.

It will be noted also that two of the six-cylinder blowers 15 are used to charge this particular twelve-cylinder engine. The impeller driving shafts of the two blower units are drivingly interconnected preferably in the manner shown and described with reference to FIGURES 5 and 6 in the aforementioned United States Patent No. 3,088,446 to Fox et al.

As best seen in FIGURE 18, an end plate 250 is secured to and closes the upper front portion 204 of the cylinder block 202. This end plate is perforated to embrace the ends of the camshafts 229 projecting from the front end of the block. A pulley member 258 having an eccentric balancing mass integral therewith is drivingly mounted on the front end of the right-hand camshaft 229. The pulley 258 may be used to drive any suitable engine or vehicle accessory such as a generator or vacuum pump, etc. The periphery of the end plate 250 defines a closely spaced clearance with the exposed periphery of the pulley member 258 to prevent any accidental insertion of a finger, tool, etc. within a weight offsetting recess formed in the back of the pulley. If the back of the pulley were not so protected, rotation of the exposed balance weight portion of the pulley relative to the upper edges of the block would serve to sever or crush the inserted member and throw pieces thereof outwardly at highly dangerous speeds. A combined balance weight and gear member 259 is drivingly secured to the front end of the other camshaft 229. The gear 259 is housed within a compartment defined between the front end plate 250 and a gear housing member 251. The gear housing member 251 is suitably secured to the front end plate and the front of the engine block and serves to support the centrifugal water pump 270. The gear 259 drivingly engages a second gear 259' which in turn drives the impeller assembly of the centrifugal water pump 270. The water pump 270 is preferably of the form shown and described in copending United States Patent No. 3,001,517, issued September 26, 1962, to Richard E. Baker and William R. Fox and entitled "Water Pump."

The water pump 270 has an inlet 271 which is connectable to the water outlet of the water cooling radiator and a single by-pass inlet 271' which is substantially opposed to the inlet 271. A cross-over manifold or tube 272" extends transversely of the front of the engine and is connected at 277' and 277", respectively, to by-pass outlet chambers 278' and 278" which are defined by upper thermostatic valve housing members 279' and 279" of thermostatic valve units 273' and 273". The outlet chamber 278' of the housing member 279' is also connected as indicated at 272' to the by-pass inlet 271' of the pump 270. The upper valve housing members 279' and 279" also define radiator outlet chambers 280' and 280" which are separated from the by-pass outlet chambers 278' and 278" by partition webs 281' and 281", respectively, and connectable through the housing defined outlets 274' and 274", respectively, to the inlet of the water cooling radiator. The upper housing members 279' and 279" are suitably secured to and supported by lower thermostatic valve housing members 283' and 283", respectively, which are in turn suitably secured to and supported by the front of the cylinder heads. The lower housing members 283' and 283" define water inlet chambers 284' and 284" which are suitably connected as indicated at 285' and 285" to the front outlets of the external water manifolds 300 of their respective cylinder banks. The water inlet chambers 284' and 284" are also connected to the front outlet ports 172 of their respective cylinder heads as indicated at 286' and 286". Each of the lower housing members 283' and 283" has a port 287' and 287", respectively, extending through the upper wall thereof. The ports 287' and 287" are in axial alignment with counterbored ports indicated at 288' and 288" in the mating lower wall of each of the upper housing members 279' and 279", respectively. The ports 287', 288' and 287", 288" are in spaced axial alignment with ports 282' and 282", respectively, extending through the partition webs 281′ and 281″.

Identical thermostatic valve units 290 of the full-flow blocking type are mounted in each of the valve housings defined by the upper and lower housing members 279′, 283′ and 279″, 283″. As best shown in FIGURE 19, the thermostatic valve units 290 each include a stationary member 290a having an outer ring portion 290b which is secured in the port defined groove intermediate the upper and lower housing members. A plurality of struts 290c extend radially inwardly from the ring portion to a central hub portion 290d. A sleeve 290e extends longitudinally from the central hub 290d and supports a thermostatic pellet unit 290f within the inlet chamber of its respective lower housing member. The thermostatic pellet unit 290f has an output rod 290g which extends through the support sleeve 290e and is reciprocably and sealingly supported relative thereto by a Teflon sleeve 290h. The end of the rod 290e distal from the thermostatic pellet 290f is slidably embraced by a central hub 290i of a sleeve valve member 290k and has a nut 290m threaded thereon outwardly of the hub 290i. The hub of the sleeve valve member 290i is normally biased toward engagement with the nut 290m by a spring 290n which is compressively interposed between the hub 290i and a spring seat member 290p carried by the plunger 290g. This construction provides a yieldable operating connection between the plunger and the sleeve valve member 290k. A spring seat member 290p is slidable on the plunger 290g and is biased into abutment with a shoulder 290r thereon not only by spring 290n but also by springs 290s and 290t. The springs 290s and 290t are compressively interposed between the support struts 290c and a spring seat member 290u which slidably embraces the support sleeve 290e and is connected to the spring seat member 290p by a plurality of longitudinally extending straps 290w. The springs 290s and 290t thus bias the plunger 290g in opposition to the force applied thereto by the thermostatic action of the pellet 290f.

The sleeve valve member 290k is connected to its hub 290i adjacent one end thereof by a plurality of equiangularly spaced radial struts 290x and is slidably supported within the port opening 282′ or 282″ of the partition wall of its respective valve housing. The sleeve valve members 290k thus cooperate with the partition walls to divide the upper valve housing members into the radiator outlet and by-pass outlet chambers 278′ and 280′ and 278″ and 280″, respectively. The sleeve valve members 290k are suitably sealed with respect to the ports 282′ and 282″ and are shiftable to a radiator outlet closed, by-pass open position by the springs 290s and 290t when the water temperature is below a designed minimum temperature. This operative position of the sleeve valve member 290k is shown in full lines in FIGURE 19. Under such operating conditions, the axial end of the sleeve valve member 290k opposite the struts 290x sealingly engages an annular valve seat 290y defined by the support member 290e thereby permitting only axial flow through the sleeve valve member to the by-pass outlet chamber 278′ or 278″ of its respective valve housing. When the water temperature in the inlet chamber 284′ or 284″ reaches the designed minimum temperature, the thermostatic pellet unit 290f acts through spring 290n to shift the sleeve valve member toward an opposite annular seat 289′ or 289″. The seats 289′ and 289″ are in the form of housing annular bosses facing the chamber 278′ and 278″, respectively, and are in coaxial alignment with the adjacent seating end of the valve sleeve member 290k. Such movement of the sleeve valve member 290k opens the annular port defined by the valve seating surface 290y and divides water flow between the radiator and the by-pass outlet chambers through a limited water temperature range. As the upper designed temperature is reached, the end of the sleeve member 290k opposite the ring 290b is urged in sealing engagement with the valve seat 289′ or 289″ as shown in full lines in FIGURE 18. This shuts off coolant flow to the by-pass outlet chamber 278′ or 278″ and causes full flow of the coolant to the radiator through the outlet chambers 280′ or 280″.

Referring now to the eight-cylinder V engine shown in side and front elevation in FIGURES 20 and 21, it will be seen that this engine is basically similar in external configuration to the twelve-cylinder V engine described immediately above. Except for elimination of external water manifolds, this eight-cylinder V engine has external water connections and a gear driven water pump similar to those of the twelve-cylinder engine. Hence, the various engine components and portions are identified by reference numerals obtained by adding 100 to the reference numerals used in describing the corresponding components and portions of the twelve-cylinder engine. With the elimination of the external water manifolds in the eight-cylinder V engine of FIGURES 20 and 21, the lower thermostatic housings 383′ and 383″ are supported solely by the front of the cylinder heads and are connected to the enlarged water outlets thereof as indicated at 386′ and 386″.

The six-cylinder V engine shown in FIGURE 22 differs from that previously described in FIGURE 5 in that it uses the same front end water connections, water pump and accessory gear drives as the eight-cylinder V engine of FIGURES 20 and 21. The eight-cylinder V engine may be similarly modified to have the water connections and belt driven water pump of the six-cylinder V engine of FIGURE 5.

In the compound engine installation shown in side elevation in FIGURE 23, two of the basic eight-cylinder V engine units 301 of FIGURES 20 and 21 are longitudinally aligned in spaced back-to-back relation. Those components common to the eight-cylinder V engine are thus identified by the same reference numerals while those components peculiar to the compound engine are identified by the addition of 400 to the reference numerals used in describing corresponding components of the basic engine of FIGURES 1–6. By way of example, the compound sixteen-cylinder V engine is designated generally by the reference numerals 401 and the external water manifold sections are designated by the reference numerals 500, 500′ and 500″.

In this compound engine, two identical gear housings 449 are interposed between the two spaced basic engines 301′ and 301″. Each engine is provided with its own accessory timing gear drive as previously described with reference to FIGURES 2–4 and thus independently and separately drive their respective camshafts, blowers, governors and other accessories. The two engine crankshafts 314 are drivingly interconnected within the gear housing compartment defined by the housing members 449, the several crankthrows of the two crankshafts being phased to provide substantially even firing through 360° of crankshaft rotation. The flywheel and power takeoff of the compound engine is located within a housing 449′ secured to the "front" of the rear engine 301.

The cylinder heads of the inline cylinder banks are provided with external water manifold sections 500 and 500″ which are interconnected intermediate the two engines by a conduit 500′. As shown for the left inline bank in FIGURE 23, the external water manifold section 500″ is connected at 485′ to the lower inlet housing 483′ of a thermostatic valve unit 473′. The lower housing member 483′ is similar to the lower housing 283′ previously described with reference to the twelve-cylinder engine of FIGURES 17–19 and provides a branch connection 486′ to the front outlet port 172 of the adjacent cylinder head. The upper valve housing member 479′ of the thermostatic valve unit 473 is provided with a radiator outlet 474′ and a by-pass outlet 478′ which is connected at 372′ to the by-pass inlet 371 of the same gear driven water pump 370 used on the previously described eight-cylinder engine. The water pump discharge 375 is connected through an elbow 393 to the water inlet of the oil cooler 394 which is mounted on the left-hand side of the front engine. The water outlet of the oil cooler is connected to the water inlet in the side of the front engine block 302.

A corresponding external water manifold, thermostatic valve unit and water pump serve the inline right banks of the compound engine. Except for the pump impeller and the gear and pump housing members, the components for the right-hand pump may be the same as for the left-hand pump. The water discharge outlet of the right-hand pump is connected through a conduit 493 to a second oil cooler unit 394 which is mounted on the right side of the block of the rear engine 301''. The water outlet of the right-hand cooler is connected to the water inlet adjacent the "front" end of the rear engine.

FIRING ORDER AND V ENGINE BALANCING

Description of FIGURES 24-33

Referring briefly to the diagram of FIGURE 24, the cylinders of the several six, eight and twelve-cylinder engines have been given designations for reference purposes in the ensuing description relative the FIGURES 25-33. The several cylinders of the left banks looking forwardly of the several engines have thus been numbered from front to rear 1L, 2L, 3L, etc. and the cylinders of the right bank have been similarly numbered 1R, 2R, 3R, etc. The cylinders of the right bank are, of course, offset slightly behind those of the left bank.

As shown in FIGURE 25, the six-cylinder V engines of FIGURES 2, 5 and 22 are provided with a crankshaft throw arrangement wherein the several crankpins 22-1, 22-2 and 22-3 are disposed at equal 120° angles to each other. The crankpin 22-1 is connected to the cylinders 1L and 1R, the crankthrow 22-2 is connected to cylinders 2L and 2R, and the crankpin 22-3 is connected to the cylinders 3L and 3R. As shown in FIGURE 26, this crankpin or throw arrangement provides a firing interval which deviates by only three and one-half degrees from an even 60° between cylinders and results in an engine in which the primary and secondary forces due to the reciprocating action of the piston masses are inherently balanced.

Balance of the primary rocking couples is accomplished by the phased counterrotating balance weights 58' and 60' shown diagrammatically in FIGURE 27. These balance weights are carried by the opposite ends of the two camshafts 29 and, as indicated above, are preferably integral with the camshaft drive gears in the rear and in the accessory drive gears or pulleys in the front of the engine. Rotating and reciprocating balance is accomplished by the placement of counterweights 64', 23-1, 23-1', 23-3, 23-3' and 64'' on the crank shaft as diagrammatically shown in FIGURE 27. The crankshaft 14 comprises spaced main journal portions 13-1, 13-2, 13-3 and 13-4. The counterweights 23-1 and 23-1' are preferably formed integrally of and co-extensively with the crankthrow webs supporting the crankpin 22-1 and the counterweights 23-3 and 23-3' are preferably formed integrally of and co-extensively of the crankthrow webs supporting the crankpin 22-3. The balance weight mass 64'' is formed integrally and eccentrically of the crankshaft in front of the main journal portion 13-1. The rear balance weight mass 64' is similarly integral and eccentric of the crankshaft axis and located intermediate the rear main journal 13-4 and the timing gear 64.

The crankshaft throw arrangement for the eight-cylinder V engine is shown diagrammatically in FIGURES 28 and 30. The several crankshaft throws 322-1, 322-2, 322-4 and 322-3 are disposed at equal 90° intervals. This crankshaft throw arrangement results in balanced primary and secondary forces and in balance of the secondary rocking couples. As shown in FIGURE 29, this crankshaft throw arrangement results in an unequal phasing of the firing order varying 23.5° and 63.5° between the several cylinders in the order 1L, 3R, 3L, 4R, 4L, 2R, 2L and 1R. Such unequal firing, however, does not seriously affect the engine torque fluctuation curve since all of the cylinders fire during each engine revolution.

The balancing system of the eight-cylinder V engine is shown diagrammatically in FIGURE 30. Balancing of primary rocking couples is accomplished in the same manner as in the six-cylinder V engine, by means of phased weights 358' and 360' carried at opposite ends of the counterrotating camshafts. The rotating and reciprocating unbalance of the crankshaft is similarly corrected by the shown placement of integral counterweights 364'', 323-1, 323-1', 323-4, 323-4' and 364' on the crankshaft, the weights 323-1 and 323-1' being co-extensive with the throw webs of pin 322-1, the weights 323-4 and 323-4' being co-extensive with the throw webs of pin 322-4, and the weights 364'' and 364' being disposed forwardly and rearwardly of the main journals 313-1 and 313-5, respectively. Additional counterweights 323-2 and 323-3 are formed integrally of the crankthrows adjacent the second and fourth main journals 313-2 and 313-4 and reduce the bearing loads which would otherwise be imposed on these journals.

As best seen in FIGURE 31, the three front crankpins 222-1, 222-2 and 222-3 and the three rear crankpins 222-4, 222-5 and 222-6 of the crankshaft 214 for the twelve-cylinder V engine are equally spaced at 120° with respect to each other but with a phase angle of 30° between the two groups. This arrangement results in a firing interval which deviates by only 3.5° from even firing between the several cylinders. Both the primary and secondary forces are balanced by this arrangement and the residual secondary rocking couple is small enough to be left unbalanced. The primary rocking couple is balanced as before by phased balance weights 258' and 260' carried adjacent the opposite ends of the two camshafts 229. Counterweights 223-1, 223-1', 223-6' are integral and co-extensive with throw webs of crankpins 2221-1 and 222-6 and balance the rotating and reciprocating unbalance imposed on the crankshaft 214. Additional counterweights 223-3 and 223-4 are disposed as shown to reduce the magnitude of the bearing load which would otherwise be imposed on the center main bearing supporting the journal 213-4.

The sixteen-cylinder V engine shown in FIGURE 23 is essentially two of the eight-cylinder V engines placed back-to-back to avoid the cost of manufacturing such a limited application multi-cylinder engine on an expected limited production volume. Hence, two of the eight-cylinder crankshafts may be drivingly secured together either by welding or through a suitable coupling to provide a suitable composite crankshaft. As in the twelve-cylinder engine, the fourth and fifth throws of this composite crankshaft would be disposed to provide a phase angle of 45° between the front and rear crankshaft sections to provide substantially even firing throughout 360° of crankshaft rotation. Appropriate removal of the front, rear and the adjacent crankthrow counterweights 364'', 364', 323-1 and 323-4' of both eight-cylinder crankshafts provides the resultant composite crankshaft with rotating balance. This physical balance of the composite crankshaft and additional balance weight mass carried by the camshafts balance the small primary couple of the compound engine, there being no primary or secondary unbalance forces.

From the foregoing description of the several illustrative V and inline engines, it will be seen that the various objectives and advantages of the invention have been achieved; that the invention provides a series of two-cycle V engines having a single included angle permitting maximum interchangeability of parts, subassemblies and engine accessories and interchangeability of machining with a series of inline two-cycle engines; that the resultant engine structures provide a plurality of different engine models and alternative accessory mounting locations;

that the common dimensioning provided between the several inline and V engines contributes substantially to the compactness and rigidity of the several V engines; and that the improved cylinder block and cylinder head constructions provide two-cycle engines of relatively high power density, provide improved engine cooling systems for such engines, and provide engines having improved breathing and overall efficiency.

It will thus be apparent to those skilled in the art that various modifications might be made from the several illustrative embodiments of the invention without departing from the spirit and scope of the invention as defined in the following claims.

We claim:

1. A two-stroke uniflow scavenged interval combustion engine comprising a cylinder block defining a crankcase with two rows of cylinders inclined therefrom and forming a central scavenging air receiver extending longitudinally between said cylinder rows with branch passages extending laterally therefrom between and around the several cylinders, two cylinder heads mounted on said cylinder block and cooperating with the upper ends of each of said cylinders to define expansible combustion chambers with pistons reciprocably mounted in each of said cylinders, each of said cylinders having a plurality of inlet ports formed circumferentially thereof intermediate its ends and controllable by reciprocation of said pistons to admit scavenging air from said laterally extending passages to the several expansible combustion chambers, a crankshaft spacedly journaled in said crankcase and having a plurality of crankpin carrying throws intermediate the spaced journaling thereof, said crankpins each being drivingly connected to pistons in laterally adjacent V'd pairs of said cylinders, each of said cylinder heads having exhaust passages therein, overhead valve means carried by each of said heads and operable to control said exhaust passages, overhead fuel injection means carried by each of said cylinder heads for sequentially introducing an oil charge to each of the several expansible combustion chambers, and two camshafts journaled in said cylinder block in spaced parallel relation to each other adjacent to and intermediate the cylinder head mounting upper ends of the several cylinder rows, the axes of said camshafts and of the crankshaft of the engine defining intersecting planes equiangularly disposed with respect to a plane common to the axes of the several cylinders of the adjacent cylinder row and to the longitudinal vertical plane of the engine.

2. A V-type engine comprising two inline rows of inclined engine cylinders, pistons reciprocably mounted in the several cylinders and operably connected to rotatably drive a common crankshaft, each of said pistons cooperating with the closed end of its respective mounting cylinder to define an expansible combustion chamber therebetween, control means carried by the closed end of said cylinders for controlling the exhausting and charging of the several cylinders, and two camshafts rotatably journaled and extending longitudinally of said engine adjacent to the upper closed ends of the several cylinder rows, said camshafts being rotatably driven by said crankshaft and operably connected to sequentially actuate said control means on the adjacent inline cylinders, and said camshafts having rotative axes equiangularly spaced about the rotative axis of the engine crankshaft with respect to the longitudinal vertical plane of the engine and to planes extending longitudinally of and common to the axes of the several adjacent inline cylinders.

3. A two-stroke uniflow scavenged internal combustion engine, a cylinder block structure defining two inline rows of cylinders inclined outwardly of a crankshaft rotative axis and forming a central scavenging air receiver extending longitudinally between said cylinder rows with branch passages extending laterally therefrom between and around the several cylinders, each of said cylinders being closed at its outwardly disposed end and having a plurality of inlet ports formed circumferentially thereof intermediate its ends and controllable by piston reciprocation to admit scavenging air therein from the adjacent laterally extending passages, each of said closed cylinder ends having exhaust passages therein and valve means associated therewith operable to control gaseous flow through said exhaust passages, and two spaced parallel camshafts journaled in said cylinder block structure in spaced parallel relation to each other adjacent and laterally between the closed upper ends of the several cylinder raws, planes including the axes of said camshaft and the crankshaft of the engine defining equal angles with respect to a plane common to the axes of the several cylinders of the adjacent cylinder row and with respect to the longitudinal vertical plane of the engine.

4. In a V-type engine comprising two inline rows of inclined engine cylinders, means for controllably charging and exhausting the several cylinders, and two camshafts rotatably journaled and extending longitudinally of said engine adjacent to and intermediate the outwardly disposed ends of the several cylinder rows, each of said camshafts being rotatably driven by said engine and operably connected to sequentially actuate said means with respect to the adjacent inline row of cylinders, the rotative axes of the camshafts and crankshaft defining intersecting planes equiangularly bisecting the angles defined by the longitudinal vertical plane of the engine and planes extending longitudinally of and common to the axes of the several adjacent inline cylinders.

5. In a two-stroke cycle engine having two V'd inline rows of cylinders, two balance shafts rotatably journaled longitudinally of said engine adjacent to and intermediate the outer ends of the several cylinders, said balance shafts carrying oppositely disposed balance weights adjacent the opposite ends thereof and being interconnected to be counterrotated by said engine, the rotative axes of said balance shafts being equidistant between the longitudinal vertical plane of the engine and two planes extending longitudinally of and common to the axes of the several adjacent inline cylinders.

6. In a two-stroke uniflow scavenged internal combustion engine, a cylinder block structure having two inclined rows of inline cylinders, said block defining a central scavenging air receiver extending longitudinally between said cylinder rows with branch passages extending laterally therefrom between and embracing the several cylinders, cylinder heads mounted on said cylinder block and closing the outwardly inclined ends of each of said cylinders, a crankshaft spacedly journaled in said cylinder block and having a plurality of crankpin throws intermediate the spaced journaling thereof, said crankpins each being drivingly connected to pistons in laterally adjacent V'd pairs of said cylinders, said pistons being reciprocably mounted in each of said cylinders and cooperating with the closed ends thereof to define expansible combustion chambers, said cylinders each having a plurality of inlet ports intermediate the ends thereof controllable by reciprocation of said pistons to admit scavenging air from the adjacent laterally extending passages to the several expansible combustion chambers, said cylinder heads having exhaust passages and valve means associated therewith operable to control exhaust gas flow through said exhaust passages, and means for sequentially actuating said valve means including two camshafts journaled in said cylinder block in spaced parallel relation to each other adjacent to and intermediate the cylinder head mounting upper ends of the several cylinder rows, the axes of said camshafts being equidistant between the longitudinal vertical median plane of the engine and planes including the axes of the adjacent inline cylinders.

7. A cylinder block construction for a two-stroke uniflow scavenged internal combustion engine comprising a crankcase defining portion, a plurality of axially aligned crankshaft journal bearings supported in spaced parallel relation by said crankcase defining portion, two inline rows of cylinders each supported at one end thereof by said crankcase defining portion and extending outwardly therefrom in inclined V'd relation, two outer cylinder support portions spaced from each other and from said lower portion, said outer cylinder support portions extending longitudinally of said cylinder rows and supporting the outwardly disposed ends of said cylinders, said outer cylinder support portions being structurally interconnected by a wall extending transversely therebetween and each defining a longitudinally extending camshaft mounting gallery intermediate said cylinder rows, a longitudinally extending water jacket gallery embracing the outwardly disposed ends of the several cylinders and a longitudinally extending water distribution gallery outboard of said cylinder row, said water jacket and distribution galleries being interconnected laterally of the block, said portions being structurally interconnected by end and side walls integral and co-extensive therewith, and said portions, walls and cylinders forming a central scavenging air receiver extending longitudinally between said cylinder rows with branch passages extending radially therefrom between and around the portions of the several cylinders intermediate the crankcase and outer support portions.

8. A cylinder block structure for a two-stroke uniflow scavenged internal combustion engine comprising a lower crankcase defining portion, a plurality of axially aligned crankshaft journal bearings supported in spaced parallel relation by webs and reinforcing struts extending transversely of said crankcase defining portion, two inline rows of cylinder liners supported at their lower ends by said crankcase defining portion and extending therefrom in inclined V'd relation, each of said cylinder liners having a plurality of air inlet ports formed circumferentially thereof intermediate its ends, two upper portions extending longitudinally of said cylinder rows in parallel spaced relation to each other and to said lower portion and supporting the upper ends of said cylinder liners, each of said upper support portions defining a longitudinally extending camshaft mounting gallery inwardly of and immediately adjacent its respective cylinder row, a longitudinally extending water jacket gallery embracing the upper supported ends of the several cylinder liners above the inlet ports and a longitudinally extending water distribution gallery outboard of its cylinder row, said upper portions being structurally interconnected by a wall and a plurality of reinforcing ribs extending transversely between said camshaft mounting galleries and having an air intake port extending therethrough, said upper and lower portions being structurally interconnected by end and side walls integral and co-extensive therewith, said upper and lower portions being further structurally interconnected by a plurality of paired transversely spaced parallel columns extending therebetween intermediate the several cylinders and adjacent the front and rear end walls, the outer most of said columns being spaced from the side walls of said block and said columns being co-extensive with said crankcase web reinforcing struts and extending through said upper portions to define water jacket gallery compartments embracing the upper supported ends of the several liners and defining ports intermediate the several compartments and the water distribution galleries, and said portions, walls and cylinders forming a central scavenging air receiver extending longitudinally between said cylinder rows with branch passages extending radially therefrom between said columns and around the portions of the several cylinder liners intermediate the water jacketed and crankcase supported ends thereof.

9. In a cylinder block as defined in claim 8, each of said camshaft mounting galleries having spaced axially aligned bearings therein defining a camshaft rotative axis and intersecting planes including the rotative axes defined by said camshaft and crankshaft bearings defining equal angles with respect to a plane common to the axes of the several cylinder liners of ecah adjacent row and with respect to the longitudinal vertical plane of the engine.

10. A cylinder block structure for a two-stroke uniflow scavenged internal combustion engine comprising a lower crankcase defining portion, a plurality of axially aligned crankshaft journal bearings supported in spaced parallel relation by webs and reinforcing struts extending transversely of said crankcase defining portion, crankcase defining portions having two inline rows of ports therein and cylindrical flanges extending upwardly therefrom in inclined V'd relation, a plurality of cylinder liners each supported at its lower end by one of said cylindrical flanges, each of said cylinder liners having a plurality of air inlet ports formed circumferentially thereof intermediate its ends and immediately above said flange, two upper portions extending longitudinally of said cylinder rows in parallel spaced relation to each other and to said lower portion and defining a plurality of cylindrical ports extending therethrough and supporting the upper ends of said cylinder liners above said inlet ports, each of said upper support portions defining a longitudinally extending camshaft mounting gallery inwardly of and immediately adjacent its respective cylinder row, a longitudinally extending water jacket gallery extending longitudinally of and embracing the upper liner supporting ports and a longitudinally extending water distribution gallery outboard of its cylinder row, said upper portions being structurally interconnected by a wall and a plurality of reinforcing ribs extending transversely between said camshaft galleries and having an air intake port extending therethrough, said upper and lower portions being structurally interconnected by end and side walls integral and co-extensive therewith and by a plurality of paired transversely spaced parallel columns extending therebetween intermediate the several cylinders and adjacent the front and rear end walls, the outermost of said structural columns being spaced from the side walls of said block, and said columns being co-extensive with said crankcase web reinforcing struts and extending through said upper portions to define water jacket gallery compartments embracing the cylindrical upper liner supporting ports and defining ports intermediate the several compartments and the water distribution galleries, said portions, walls, cylinder liners and the lower liner supporting flanges defining a central scavenging air receiving chamber extending longitudinally between said cylinder rows with branch passages extending radially therefrom between said columns and around the liner supporting flanges and the inlet port portions of the several cylinder liners immediately below the water jacketed upper supported ends thereof, and two partition walls extending longitudinally and laterally of each cylinder row between the upper ends of said liner supporting flanges and the adjacent columns and side wall of the block, said partition walls dividing said branch passages into upper and lower portions and having a plurality of air distributing ports therein adjacent the side walls of the block.

11. In a cylinder block as defined in claim 10, each of said camshaft mounting galleries having spaced axially aligned bearings therein defining a camshaft rotative axis and said camshaft axes being substantially equally spaced from planes including the axes of the several cylinder liners of their adjacent cylinder row and the longitudinal vertical plane of the engine.

12. A cylinder block structure for a two-stroke uniflow scavenged internal combustion engine comprising a lower crankcase defining portion, a plurality of axially aligned crankshaft journal bearings supported in spaced parallel relation by webs and reinforcing struts extending transversely of said crankcase defining portion, said crankcase having two inline rows of ports therein in part defined by a plurality of cylindrical flanges extending therefrom in inclined V'd relation, a plurality of cylinder liners supported at their lower ends by said cylindrical flanges, each of said cylinder liners having a plurality of air inlet ports formed circumferentially thereof above its supporting flange, two upper portions extending longitudinally of said cylinder rows in parallel spaced relation to each other and to said lower portion and having a plurality of spaced axially aligned ports therein sealed with respect to and supporting the upper ends of said cylinder liners above the inlet ports, each of said upper support portions defining a longitudinally extending camshaft mounting gallery inwardly of and immediately adjacent its respective cylinder row, a longitudinally extending water jacket gallery embracing the upper port supported ends of the several cylinder liners and a longitudinally extending water distribution gallery outboard of its cylinder row, said upper portions being structurally interconnected by a wall and a plurality of reinforcing ribs extending transversely between said camshaft mounting galleries and having an air intake port extending therethrough, said upper and lower portions being structurally interconnected by end and side walls integral and co-extensive therewith and by a plurality of paired transversely spaced parallel columns extending therebetween intermediate the several cylinders and adjacent the front and rear end walls, the outermost of said columns being spaced from the side walls of said block and said columns being co-extensive with said crankcase web reinforcing struts and extending through said upper portion to define water jacket gallery compartments embracing the upper supported ends of the several liners and defining ports intermediate the several compartments and the water distribution galleries, and said portions, walls, liners and the liner supporting flanges defining a central scavenging air receiving chamber extending longitudinally between said cylinder rows and branch passages extending radially therefrom between said columns and around the liner supporting flanges and the portions of the several cylinder liners intermediate the water jacket galleries and the flange supported lower ends thereof.

13. In a cylinder block as defined in claim 12, said camshaft mounting galleries defining camshaft rotative axes equiangularly disposed about the crankshaft rotative axis between the longitudinal vertical plane of the engine and intersecting planes including the cylinder axes of each inline row.

14. A cylinder block structure for a two-stroke uniflow scavenged internal combustion engine comprising a lower crankcase defining portion, a plurality of axially aligned crankshaft journal bearings supported in spaced parallel relation by webs and reinforcing struts extending transversely of said crankcase defining portion, said crankcase defining an inline row of ports extending therethrough intermediate the bearing supporting webs and defined in part by cylindrical flanges, a plurality of cylinders each supported at its lower end by one of said flanges, each of said cylinders having a plurality of air inlet ports formed circumferentially thereof intermediate its ends, an upper portion extending longitudinally of said cylinder rows in parallel spaced relation to said lower portion and supporting the upper ends of said cylinder liners above the inlet ports, said upper support portion defining two parallel balance shaft mounting galleries extending longitudinally of said cylinder row, a longitudinally extending water jacket gallery embracing the upper supported ends of the several cylinder liners and at least one water distribution gallery extending longitudinally of the cylinder row, said upper and lower portions being structurally interconnected by end and side walls integral and co-extensive therewith and by a plurality of paired transversely spaced parallel columns extending therebetween intermediate the several cylinders and adjacent the front and rear end walls, said columns being spaced from the side walls of said block and co-extensive with said crankcase web reinforcing struts and extending through said upper portion to define water jacket gallery compartments embracing the upper supported ends of the several liners, said columns further defining ports intermediate the several compartments and between the water jacket and distribution galleries, and said portions, walls, liners and liner supporting flanges defining a scavenging air receiver extending longitudinally of the block and having substantially unrestricted branch passages extending between said columns and around the liner supporting flanges and the portions of the several cylinder liners intermediate the water jacketed and crankcase flange supported ends thereof.

15. In a two-stroke cycle uniflow scavenged engine as defined in claim 6, oppositely disposed balance weight means carried by the opposite ends of said camshafts for balancing the primary rocking couple of said engine, means for drivingly connecting said camshafts to be counterrotated by said crankshaft in phased relation thereto to sequentially actuate said valve means and balance said primary rocking couple, and counterweight means associated with said crankshaft for balancing rotating and reciprocating unbalance and to reduce bearing loads otherwise imposed on certain of said crankshaft journals.

16. In a two-stroke cycle uniflow scavenged engine as defined in claim 15, said engine having six cylinders and the several crankpin throws being disposed equiangularly about the rotative axis of the crankshaft to provide substantially even firing of the cylinders deviating therefrom by the difference between the included angle between the cylinder rows and 60°.

17. In a two-stroke cycle uniflow scavenged engine as defined in claim 15, said engine having twelve cylinders, the three crankpin throws at opposite ends of said crankshaft being equiangularly disposed with respect to each other, the two groups of crankpin throws being offset 30° with respect to each other to provide substantially even cylinder firing through 360° of crankshaft rotation deviating therefrom by the difference between the included angle between the cylinder rows and 60°.

18. In a two-stroke cycle uniflow scavenged engine as defined in claim 15, said engine having eight cylinders, the four crankpin throws of the crankshaft being equiangularly disposed with respect to each other to provide substantial uneven firing of the several cylinders throughout 360° of crankshaft rotation deviating from even firing of the several cylinders by the difference between the included angle of the inclined cylinder rows and 45°.

19. In a pressure charged internal combustion engine, a cylinder block comprising a crankcase defining portion, two inline rows of cylinders supported by the crankcase portion and V'd outwardly therefrom, two outer portions of the block longitudinally supporting the outwardly disposed ends of the cylinders in spaced relation to the crankcase portion, said outer cylinder supporting portions being spaced laterally from each other and structurally interconnected by a blower mounting wall extending transversely therebetween, and each of said outer cylinder supporting portions defining a longitudinally extending camshaft mounting gallery structurally reinforcing the blower mounting wall intermediate the cylinder rows and a longitudinally extending water jacket gallery embracing the outwardly disposed ends of the several cylinders of its respective inline cylinder row.

20. In an internal combustion engine as set forth in claim 19, the crankcase and outer cylinder support portions of the block being structurally interconnected by end and side walls integral and co-extensive therewith, and said block portions, walls and cylinders forming a central scavenging air receiver connectable to a charging blower mountable on said transversely extending wall and extending longitudinally between said cylinder rows with branch passages extending laterally therefrom and embracing the several cylinders and inlet ports spaced and opening circumferentially thereof intermediate the crankcase and outer support portions whereby the portions of said cylinders intermediate said crankcase and outer support portions are substantially cooled by the scavenging air supplied to said receiver by the charging blower.

21. In a two-stroke internal combustion engine, a cylinder block defining two V'd inline rows of cylinders each having a plurality of inlet ports circumferentially spaced intermediate the ends thereof and controllable by piston reciprocation and a central scavenging air receiver extending longitudinally between said cylinder rows and having branch passages laterally embracing the inlet ports of the several cylinders, two cam and balance shafts journaled longitudinally of the cylinder block intermediate and adjacent the outer ends of the cylinder rows and drivingly interconnected for counterrotation by the engine, the rotative axes of said cam and balance shafts being equidistant between the longitudinal vertical median plane of the engine and two planes extending longitudinally of and common to the axes of the several adjacent inline cylinders, the portions of the block journalling said shafts structurally reinforcing and supporting the outer ends of the V'd cylinder rows, and said block further having a perforated wall extending transversely between and structurally interconnecting said shaft journalling portions and cooperating therewith to support a blower communicating through the perforations in said wall with the air receiver.

22. In an internal combustion engine having two V'd inline rows of cylinders, two camshafts rotatably journaled longitudinally of the engine intermediate and adjacent the V'd outer ends of the cylinder rows and drivingly counterrotated by the engine, the rotative axes of said camshafts each being substantially equidistant between the longitudinal vertical median plane of the engine and a plane common to axes of the adjacent inline cylinders, and the portions of the engine journalling said shafts structurally supporting the outer ends of the V'd cylinders and being structurally integral with and reinforcing a wall portion extending transversely therebetween.

23. In an internal combustion engine having two V'd inline rows of cylinders, two camshafts rotatably journaled longitudinally of the engine intermediate and adjacent the V'd outer ends of the cylinder rows, the portions of the engine journalling said shafts structurally supporting the outer ends of the V'd cylinders and reinforcing a wall extending integrally and transversely therebetween, and the rotative axes of said camshafts each being equidistant between the longitudinal vertical median plane of the engine and a plane common to the axes of the several cylinders of the adjacent inline cylinder row.

24. In a two-stroke uniflow scavenged internal combustion engine, a cylinder block comprising a crankcase defining portion, two inline rows of cylinders supported by the crankcase portion and V'd outwardly therefrom, two outer portions of the block longitudinally supporting the outwardly disposed ends of the cylinders in spaced relation to the crankcase portion, said outer cylinder supporting portions being spaced laterally from each other and structurally interconnected by a blower mounting wall extending transversely therebetween, each of said outer cylinder supporting portions defining a longitudinally extending camshaft mounting gallery structurally reinforcing the blower mounting wall intermediate the cylinder rows, a longitudinally extending water jacket gallery embracing the outwardly disposed ends of the several inline cylinders and a longitudinally extending water distribution gallery outboard of the inline cylinder row, said water jacket and distribution galleries being interconnected laterally of the block, and said crankcase and outer cylinder supporting portions being structurally interconnected by end and side walls integral and coextensive therewith, said block portions, walls and cylinders forming a central scavenging air receiver extending longitudinally between said cylinder rows with branch passages extending laterally therefrom embracing the several cylinders and inlet ports spaced and opening circumferentially thereof intermediate the crankcase and outer cylinder supporting portions.

References Cited in the file of this patent
UNITED STATES PATENTS

| | | |
|---|---|---|
| 1,740,790 | Stanton | Dec. 24, 1929 |
| 1,848,987 | Anibal | Mar. 8, 1932 |
| 1,898,459 | Newcomb | Feb. 21, 1933 |
| 2,099,852 | Knudsen | Nov. 23, 1937 |
| 2,161,942 | Zoerlein | June 13, 1939 |
| 2,179,709 | Brecht | Nov. 14, 1939 |
| 2,232,841 | Dickson | Feb. 25, 1941 |
| 2,354,227 | Szekely | July 25, 1944 |
| 2,468,735 | Brubaker | May 3, 1949 |
| 2,609,801 | Kiekhaefer | Sept. 9, 1952 |
| 2,654,355 | Scheiterlein | Oct. 6, 1953 |
| 2,956,642 | Chaplin et al. | Oct. 18, 1960 |

FOREIGN PATENTS

| | | |
|---|---|---|
| 370,955 | Great Britain | Apr. 8, 1932 |
| 422,022 | Italy | May 25, 1946 |

OTHER REFERENCES

Engine Maintenance Manual No. 252C for Model 567C Engines, 1st Edition, March 1954.

Kiel: German application 1,011,665, printed July 4, 1957, (Kl. 46a").